United States Patent

Bansi et al.

(10) Patent No.: US 10,421,019 B2
(45) Date of Patent: Sep. 24, 2019

(54) SYSTEM AND METHOD FOR ENABLING PLAYERS TO PARTICIPATE IN ASYNCHRONOUS, COMPETITIVE CHALLENGES

(71) Applicant: Activision Publishing, Inc., Santa Monica, CA (US)

(72) Inventors: Charnjit Singh Bansi, Runcorn (GB); Paul Kerby, Liverpool (GB)

(73) Assignee: Activision Publishing, Inc., Santa Ana, CA (US)

( * ) Notice: Subject to any disclaimer, the term of this patent is extended or adjusted under 35 U.S.C. 154(b) by 0 days.

(21) Appl. No.: 15/594,874

(22) Filed: May 15, 2017

(65) Prior Publication Data

US 2017/0312638 A1  Nov. 2, 2017

Related U.S. Application Data

(63) Continuation of application No. 12/778,884, filed on May 12, 2010, now Pat. No. 9,682,324.

(51) Int. Cl.
*A63F 13/795* (2014.01)
*A63F 13/69* (2014.01)

(52) U.S. Cl.
CPC ............ *A63F 13/795* (2014.09); *A63F 13/69* (2014.09); *A63F 2300/5566* (2013.01); *A63F 2300/6036* (2013.01); *A63F 2300/61* (2013.01)

(58) Field of Classification Search
CPC ..................... A63F 13/795; A63F 13/69; A63F 2300/5566; A63F 2300/6036; A63F 2300/61; G06F 3/048; G06F 3/04883; G06F 9/4443; G07F 17/3244; G07F 17/32; G07F 17/3258

USPC .......................................................... 463/23
See application file for complete search history.

(56) References Cited

U.S. PATENT DOCUMENTS

| 4,461,301 A | 7/1984 | Ochs |
| 5,031,089 A | 7/1991 | Liu |
| 5,058,180 A | 10/1991 | Khan |
| 5,365,360 A | 11/1994 | Torres |

(Continued)

FOREIGN PATENT DOCUMENTS

| AU | 768367 | 3/2004 |
| AU | 2005215048 | 10/2011 |

(Continued)

OTHER PUBLICATIONS

Notice of Allowance dated Feb. 16, 2017 for U.S. Appl. No. 12/778,884.

(Continued)

*Primary Examiner* — David L Lewis
*Assistant Examiner* — Matthew D Hoel
(74) *Attorney, Agent, or Firm* — Novel IP

(57) ABSTRACT

Players are enabled to participate in competitive challenges within a videogame. The challenges may provide for interactive play between players while the players play the videogame in an asynchronous manner. The challenges may be based on actual performances of one or more tasks by the players within the videogame. The tasks may include, for example, one or more of a race, a battle, a fight, a musical performance (or simulated music performance), a puzzle, and/or other objectives or tasks.

26 Claims, 17 Drawing Sheets

(56) References Cited

U.S. PATENT DOCUMENTS

| | | |
|---|---|---|
| 5,442,569 A | 8/1995 | Osano |
| 5,497,186 A | 3/1996 | Kawasaki |
| 5,509,122 A | 4/1996 | Bartow |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon et al. |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,990,887 A | 11/1999 | Redpath |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon et al. |
| 6,021,268 A | 2/2000 | Johnson |
| 6,025,839 A | 2/2000 | Schell |
| 6,049,798 A | 4/2000 | Bishop |
| 6,049,819 A | 4/2000 | Buckle |
| 6,058,266 A | 5/2000 | Megiddo |
| 6,059,842 A | 5/2000 | Dumarot |
| 6,067,355 A | 5/2000 | Lim |
| 6,069,632 A | 5/2000 | Mullaly |
| 6,076,093 A | 6/2000 | Pickering |
| 6,081,270 A | 6/2000 | Berry |
| 6,081,271 A | 6/2000 | Bardon et al. |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,134,588 A | 10/2000 | Guenthner |
| 6,141,699 A | 10/2000 | Luzzi |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,212,548 B1 | 4/2001 | DeSimone |
| 6,222,551 B1 | 4/2001 | Schneider |
| 6,226,686 B1 | 5/2001 | Rothschild |
| 6,271,842 B1 | 8/2001 | Bardon |
| 6,271,843 B1 | 8/2001 | Lection |
| 6,282,547 B1 | 8/2001 | Hirsch |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,349,335 B1 | 2/2002 | Jenney |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,553,389 B1 | 4/2003 | Golding |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,574,663 B1 | 6/2003 | Bakshi |
| 6,578,054 B1 | 6/2003 | Hopmann |
| 6,580,981 B1 | 6/2003 | Masood |
| 6,601,084 B1 | 7/2003 | Bhaskaran |
| 6,618,751 B1 | 9/2003 | Challenger |
| 6,631,247 B1 | 10/2003 | Motoyama |
| 6,640,230 B1 | 10/2003 | Alexander |
| 6,640,241 B1 | 10/2003 | Ozzie |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon et al. |
| 6,668,173 B2 | 12/2003 | Greene |
| 6,678,719 B1 | 1/2004 | Stimmel |
| 6,684,255 B1 | 1/2004 | Martin |
| 6,717,600 B2 | 4/2004 | Dutta |
| 6,728,761 B2 | 4/2004 | Decime |
| 6,734,884 B1 | 5/2004 | Berry |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,886,050 B2 | 4/2005 | Takamizawa |
| 6,920,478 B2 | 7/2005 | Mendiola |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |

(56) References Cited

U.S. PATENT DOCUMENTS

| | | | |
|---|---|---|---|
| 7,028,296 B2 | 4/2006 | Irfan | |
| 7,062,533 B2 | 6/2006 | Brown | |
| 7,084,754 B2 | 8/2006 | Benejam | |
| 7,089,266 B2 | 8/2006 | Stolte | |
| 7,124,071 B2 | 10/2006 | Rich | |
| 7,124,164 B1 | 10/2006 | Chemtob | |
| 7,139,792 B1 | 11/2006 | Mishra | |
| 7,143,409 B2 | 11/2006 | Herrero | |
| 7,159,217 B2 | 1/2007 | Pulsipher | |
| 7,171,448 B1 | 1/2007 | Danielsen | |
| 7,185,067 B1 | 2/2007 | Viswanath | |
| 7,209,137 B2 | 4/2007 | Brokenshire | |
| 7,230,616 B2 | 6/2007 | Taubin | |
| 7,236,472 B2 | 6/2007 | Lazaridis | |
| 7,240,093 B1 | 7/2007 | Danieli | |
| 7,249,123 B2 | 7/2007 | Elder | |
| 7,263,511 B2 | 8/2007 | Bodin | |
| 7,278,108 B2 | 10/2007 | Duarte | |
| 7,283,805 B2 | 10/2007 | Agrawal | |
| 7,287,053 B2 | 10/2007 | Bodin | |
| 7,292,870 B2 | 11/2007 | Heredia | |
| 7,305,438 B2 | 12/2007 | Christensen | |
| 7,308,476 B2 | 12/2007 | Mannaru | |
| 7,328,242 B1 | 2/2008 | McCarthy | |
| 7,337,353 B2 | 2/2008 | Yamamoto | |
| 7,353,295 B1 | 4/2008 | Crow | |
| 7,363,355 B2 | 4/2008 | Knauerhase | |
| 7,383,307 B2 | 6/2008 | Kirkland | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,180 B2 | 12/2008 | Kaufman | |
| 7,467,181 B2 | 12/2008 | McGowan | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,525,964 B2 | 4/2009 | Astley | |
| 7,552,177 B2 | 6/2009 | Kessen | |
| 7,565,650 B2 | 7/2009 | Bhogal | |
| 7,571,224 B2 | 8/2009 | Childress | |
| 7,571,389 B2 | 8/2009 | Broussard | |
| 7,580,888 B2 | 8/2009 | Ur | |
| 7,590,984 B2 | 9/2009 | Kaufman | |
| 7,596,596 B2 | 9/2009 | Chen | |
| 7,617,283 B2 | 11/2009 | Aaron | |
| 7,640,587 B2 | 12/2009 | Fox | |
| 7,667,701 B2 | 2/2010 | Leah | |
| 7,698,656 B2 | 4/2010 | Srivastava | |
| 7,702,730 B2 | 4/2010 | Spataro | |
| 7,702,784 B2 | 4/2010 | Berstis | |
| 7,714,867 B2 | 5/2010 | Doi | |
| 7,719,532 B2 | 5/2010 | Schardt | |
| 7,719,535 B2 | 5/2010 | Tadokoro | |
| 7,734,691 B2 | 6/2010 | Creamer | |
| 7,737,969 B2 | 6/2010 | Shen | |
| 7,743,095 B2 | 6/2010 | Goldberg | |
| 7,747,679 B2 | 6/2010 | Galvin | |
| 7,765,478 B2 | 7/2010 | Reed | |
| 7,768,514 B2 | 8/2010 | Pagan | |
| 7,773,087 B2 | 8/2010 | Fowler | |
| 7,774,407 B2 | 8/2010 | Daly | |
| 7,782,318 B2 | 8/2010 | Shearer | |
| 7,792,263 B2 | 9/2010 | D Amora | |
| 7,792,801 B2 | 9/2010 | Hamilton, II | |
| 7,796,128 B2 | 9/2010 | Radzikowski | |
| 7,808,500 B2 | 10/2010 | Shearer | |
| 7,814,152 B2 | 10/2010 | McGowan | |
| 7,827,318 B2 | 11/2010 | Hinton | |
| 7,843,471 B2 | 11/2010 | Doan | |
| 7,844,663 B2 | 11/2010 | Boutboul | |
| 7,844,673 B2 | 11/2010 | Bostick | |
| 7,847,799 B2 | 12/2010 | Taubin | |
| 7,856,469 B2 | 12/2010 | Chen | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |
| 7,890,623 B2 | 2/2011 | Bates | |
| 7,893,936 B2 | 2/2011 | Shearer | |
| 7,904,829 B2 | 3/2011 | Fox | |
| 7,921,128 B2 | 4/2011 | Hamilton, II | |
| 7,940,265 B2 | 5/2011 | Brown | |
| 7,945,620 B2 | 5/2011 | Bou-Ghannam | |
| 7,945,802 B2 | 5/2011 | Hamilton, II | |
| 7,955,175 B1 * | 6/2011 | Holloway | A63F 13/822 |
| | | | 273/317.1 |
| 7,970,837 B2 | 6/2011 | Lyle | |
| 7,970,840 B2 | 6/2011 | Cannon | |
| 7,985,138 B2 | 7/2011 | Acharya | |
| 7,990,387 B2 | 8/2011 | Hamilton, II | |
| 7,996,164 B2 | 8/2011 | Hamilton, II | |
| 8,001,161 B2 | 8/2011 | Finn | |
| 8,004,518 B2 | 8/2011 | Fowler | |
| 8,005,025 B2 | 8/2011 | Bodin | |
| 8,006,182 B2 | 8/2011 | Bates | |
| 8,013,861 B2 | 9/2011 | Hamilton, II | |
| 8,018,453 B2 | 9/2011 | Fowler | |
| 8,018,462 B2 | 9/2011 | Bhogal | |
| 8,019,797 B2 | 9/2011 | Hamilton, II | |
| 8,019,858 B2 | 9/2011 | Bauchot | |
| 8,022,948 B2 | 9/2011 | Garbow | |
| 8,022,950 B2 | 9/2011 | Brown | |
| 8,026,913 B2 | 9/2011 | Garbow | |
| 8,028,021 B2 | 9/2011 | Reisinger | |
| 8,028,022 B2 | 9/2011 | Brownholtz | |
| 8,037,416 B2 | 10/2011 | Bates | |
| 8,041,614 B2 | 10/2011 | Bhogal | |
| 8,046,700 B2 | 10/2011 | Bates | |
| 8,051,462 B2 | 11/2011 | Hamilton, II | |
| 8,055,656 B2 | 11/2011 | Cradick | |
| 8,056,121 B2 | 11/2011 | Hamilton, II | |
| 8,057,307 B2 | 11/2011 | Berstis | |
| 8,062,130 B2 | 11/2011 | Smith | |
| 8,063,905 B2 | 11/2011 | Brown | |
| 8,070,601 B2 | 12/2011 | Acharya | |
| 8,082,245 B2 | 12/2011 | Bates | |
| 8,085,267 B2 | 12/2011 | Brown | |
| 8,087,999 B2 * | 1/2012 | Oberberger | G07F 17/32 |
| | | | 463/25 |
| 8,089,481 B2 | 1/2012 | Shearer | |
| 8,092,288 B2 | 1/2012 | Theis | |
| 8,095,881 B2 | 1/2012 | Reisinger | |
| 8,099,338 B2 | 1/2012 | Betzler | |
| 8,099,668 B2 | 1/2012 | Garbow | |
| 8,102,334 B2 | 1/2012 | Brown | |
| 8,103,640 B2 | 1/2012 | Lo | |
| 8,103,959 B2 | 1/2012 | Cannon | |
| 8,105,165 B2 | 1/2012 | Karstens | |
| 8,108,774 B2 | 1/2012 | Finn | |
| 8,113,959 B2 | 2/2012 | De Judicibus | |
| 8,117,551 B2 | 2/2012 | Cheng | |
| 8,125,485 B2 | 2/2012 | Brown | |
| 8,127,235 B2 | 2/2012 | Haggar | |
| 8,127,236 B2 | 2/2012 | Hamilton, II | |
| 8,128,487 B2 | 3/2012 | Hamilton, II | |
| 8,131,740 B2 | 3/2012 | Cradick | |
| 8,132,235 B2 | 3/2012 | Bussani | |
| 8,134,560 B2 | 3/2012 | Bates | |
| 8,139,060 B2 | 3/2012 | Brown | |
| 8,139,780 B2 | 3/2012 | Shearer | |
| 8,140,340 B2 | 3/2012 | Bhogal | |
| 8,140,620 B2 | 3/2012 | Creamer | |
| 8,140,978 B2 | 3/2012 | Betzler | |
| 8,140,982 B2 | 3/2012 | Hamilton, II | |

(56) References Cited

U.S. PATENT DOCUMENTS

| | | |
|---|---|---|
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,282,458 B2 * | 10/2012 | Reynolds ............... A63F 13/12 463/40 |
| 8,287,341 B1 * | 10/2012 | Reynolds ............... A63F 13/12 463/40 |
| 8,287,382 B2 * | 10/2012 | Holloway ............. A63F 13/822 273/317.1 |
| 8,303,416 B1 * | 11/2012 | Thakkar ................ A63F 13/12 463/42 |
| 8,310,497 B2 | 11/2012 | Comparan |
| 8,328,643 B1 * | 12/2012 | Osvald ................ G06Q 10/101 463/42 |
| 8,334,871 B2 | 12/2012 | Hamilton, II |
| 8,342,967 B2 * | 1/2013 | Thakkar ................ A63F 13/12 463/42 |
| 8,348,765 B1 * | 1/2013 | Thakkar ................ A63F 13/12 463/42 |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,663,012 B2 * | 3/2014 | Weingardt .......... G07F 17/3276 463/16 |
| 8,692,835 B2 | 4/2014 | Hamilton, II |
| 8,721,412 B2 | 5/2014 | Chudley |
| 8,762,197 B2 * | 6/2014 | Dhillon ................ A63F 13/335 705/14.1 |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0035480 A1 | 3/2002 | Gordon |
| 2002/0043568 A1 | 4/2002 | Hess |
| 2002/0065870 A1 | 5/2002 | Baehr-Jones |
| 2002/0095586 A1 | 7/2002 | Doyle |
| 2002/0097856 A1 | 7/2002 | Wullert |
| 2002/0124137 A1 | 9/2002 | Ulrich |
| 2002/0130904 A1 | 9/2002 | Becker |
| 2002/0135618 A1 | 9/2002 | Maes |
| 2002/0184089 A1 | 12/2002 | Tsou |
| 2002/0184373 A1 | 12/2002 | Maes |
| 2002/0184391 A1 | 12/2002 | Phillips |
| 2002/0198946 A1 | 12/2002 | Wang |
| 2003/0003938 A1 | 1/2003 | ONeill |
| 2003/0008712 A1 | 1/2003 | Poulin |
| 2003/0023691 A1 | 1/2003 | Knauerhase |
| 2003/0037103 A1 | 2/2003 | Salmi |
| 2003/0055892 A1 | 3/2003 | Huitema |
| 2003/0056002 A1 | 3/2003 | Trethewey |
| 2003/0061622 A1 | 3/2003 | Nebiker |
| 2003/0076353 A1 | 4/2003 | Blackstock |
| 2003/0101343 A1 | 5/2003 | Eaton |
| 2003/0135621 A1 | 7/2003 | Romagnoli |
| 2003/0145128 A1 | 7/2003 | Baird |
| 2003/0177187 A1 | 9/2003 | Levine |
| 2003/0195957 A1 | 10/2003 | Banginwar |
| 2003/0210265 A1 | 11/2003 | Haimberg |
| 2003/0218631 A1 | 11/2003 | Malik |
| 2004/0014514 A1 | 1/2004 | Yacenda |
| 2004/0054667 A1 | 3/2004 | Kake |
| 2004/0078432 A1 | 4/2004 | Manber |
| 2004/0078596 A1 | 4/2004 | Kent |
| 2004/0097287 A1 * | 5/2004 | Postrel ................ G07F 17/32 463/41 |
| 2004/0103079 A1 | 5/2004 | Tokusho |
| 2004/0113756 A1 | 6/2004 | Mollenkopf |
| 2004/0143852 A1 * | 7/2004 | Meyers ................ A63F 13/12 725/133 |
| 2004/0186886 A1 | 9/2004 | Galli et al. |
| 2004/0210627 A1 | 10/2004 | Kroening |
| 2004/0228291 A1 | 11/2004 | Huslak |
| 2004/0244006 A1 | 12/2004 | Kaufman |
| 2004/0254998 A1 | 12/2004 | Horvitz |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0091380 A1 | 4/2005 | Gonen |
| 2005/0097440 A1 | 5/2005 | Lusk |
| 2005/0132009 A1 | 6/2005 | Solie |
| 2005/0138108 A1 | 6/2005 | Galvin |
| 2005/0149620 A1 | 7/2005 | Kirkland |
| 2005/0165893 A1 | 7/2005 | Feinberg |
| 2005/0223075 A1 | 10/2005 | Swearingen et al. |
| 2005/0246711 A1 | 11/2005 | Berstis |
| 2005/0277455 A1 | 12/2005 | Chudley |
| 2006/0026253 A1 | 2/2006 | Kessen |
| 2006/0031322 A1 | 2/2006 | Kessen |
| 2006/0117087 A1 | 6/2006 | Demsky |
| 2006/0155813 A1 | 7/2006 | Dietz et al. |
| 2006/0161852 A1 | 7/2006 | Chen |
| 2006/0190591 A1 | 8/2006 | Bobde |
| 2007/0180040 A1 | 8/2007 | Etgen |
| 2007/0250622 A1 | 10/2007 | Granito |
| 2007/0265092 A1 | 11/2007 | Betteridge |

(56) References Cited

U.S. PATENT DOCUMENTS

| | | | |
|---|---|---|---|
| 2008/0019353 A1 | 1/2008 | Foote | |
| 2008/0046510 A1 | 2/2008 | Beauchamp | |
| 2008/0113815 A1* | 5/2008 | Weingardt | G07F 17/32 463/42 |
| 2008/0126350 A1 | 5/2008 | Shoemaker | |
| 2008/0140794 A1 | 6/2008 | Rybak | |
| 2008/0270605 A1 | 10/2008 | Berstis | |
| 2008/0301405 A1 | 12/2008 | Kaufman | |
| 2009/0111581 A1* | 4/2009 | Ostergren | A63F 13/12 463/42 |
| 2009/0113448 A1 | 4/2009 | Smith | |
| 2010/0160038 A1* | 6/2010 | Youm | A63F 13/10 463/29 |
| 2012/0244948 A1* | 9/2012 | Dhillon | G06Q 30/0209 463/42 |
| 2013/0079075 A1* | 3/2013 | Osvald | G06Q 10/101 463/7 |
| 2013/0079095 A1 | 3/2013 | Malle | |
| 2014/0045595 A1* | 2/2014 | Baschnagel, III | A63F 13/10 463/40 |
| 2014/0344725 A1 | 11/2014 | Bates | |
| 2016/0191671 A1 | 6/2016 | Dawson | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2010096738 A1 | 8/2010 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0060444 A1 | 10/2000 |
| WO | 0143470 A1 | 6/2001 |
| WO | 0203645 A2 | 1/2002 |
| WO | 0238223 A2 | 5/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |

OTHER PUBLICATIONS

Office Action dated Mar. 27, 2012 for U.S. Appl. No. 12/778,884.
Twisted Metal 2 for Playstation Game Manual. Released Oct. 31, 1996. Last accessed Mar. 17, 2012. http://replacementdocs.com/request.php?1201.
Office Action dated Nov. 19, 2012 for U.S. Appl. No. 12/778,884.
Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb-er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI=http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.

(56) References Cited

OTHER PUBLICATIONS

Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Peter Saint-Andre, XEP-0149: Time Periods, <http://www.xmpp.org/extensions/ xep-0149.html (Jan. 24, 2006).
Chung-Ming Huang et al., Timed Protocol Verification for Estelle-Specified Protocols, Laboratory of Computer Aided Protocol Engineering (LOCAPE), Institute of Information Engineering National Cheng Kung University, Tainan, Taiwan 70101 R.O.C. (Jul. 1995).
Schulzrinne, RFC 4481 on Timed Presence Extensions to the Presence Information Data Format (PIDF) to Indicate Status Information for Past and Future Time Intervals, <http://www1.ietf.org/mail-archive/web/ietf-announce/current/msg02701.-html> (Jul. 2006).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

\* cited by examiner

SYSTEM AND METHOD FOR ENABLING PLAYERS TO PARTICIPATE IN ASYNCHRONOUS, COMPETITIVE CHALLENGES

FIELD OF THE INVENTION

The invention relates to enabling players to interact within a videogame through asynchronous, competitive challenges that are based on player performance within the videogame, with challenge criteria defining the challenges that may be selected by the players, and including providing locked content to players on a temporary basis to enable them to attempt to perform the challenge under the same criteria as the previous player.

BACKGROUND OF THE INVENTION

Conventional videogame systems may enable players in geographically disparate locations to interact and/or compete within a videogame. Typically, these systems enable players to play the games at the same time (or "synchronously"). For example, some games have a multiplayer mode to enable two or more players to simultaneously play an instance of the game with or against each other. Typically, these games simultaneously display each player's performance in the game, so that each player can see their relative performance as compared with the other player(s). Generally, playing videogames in this manner may require some level of system compatibility between the systems of the different players (e.g., the same type of console).

While some players enjoy playing videogames interactively with other people, differences in schedule and/or gaming systems may prevent them from playing with the people they would most enjoy playing with. In other cases, two or more players may individually play separate instances of a common game at the same, or different times, and may share their results in a variety of known ways. For example, in some games one or more performance metrics are determined (often at the conclusion of the game or portion of the game). The one or more performance metrics for the individual players can be shared and compared to see who obtained a top score, best time, or other optimal performance metric.

SUMMARY

One aspect of the invention relates to systems and methods for enabling players to create, issue, and participate in competitive challenges with one or more other user-designated players within a videogame, virtual world, and/or other digital environment. The challenges may include a wide variety of challenges in a wide variety of games. For simplicity, some of the features of the system and method are discussed below with reference to racing, shooting, fighting, role-playing, and/or strategy games, by way of example. Additionally, a challenge may be issued to more than one other player. For simplicity, many of the examples refer to only one challenge recipient.

A challenge may include challenge criteria that is user-selected by an issuing player, and/or associated with the challenge on some other basis (e.g., predefined challenge criteria, and/or other basis). The challenge criteria may include one or more challenge parameters, one or more challenge metrics, and/or other criteria. The challenge parameters may define a task (or tasks) to be performed as part of the challenge (e.g., the activities required to complete the task), the context of the task, the conditions during the task, the resources available in performing the task, the settings of the game during performance of the task, and/or other aspects of the challenge. The challenge metrics may include one or more performance metrics that characterize the performance of the task by players (e.g., lap time, finishing position, hits absorbed, damage created, and/or other metrics). The challenge may include values for the challenge metrics that set a threshold level of performance required during performance of the task in order to complete the challenge.

In creating the challenge, the values for the challenge metrics may be obtained from values for the challenge metrics achieved by the player issuing the challenge. The challenge parameters may define, at least in part, the same task that was accomplished by the player issuing the challenge when the values for the challenge metrics were achieved. For example, if for a given task (e.g., a race) a first player achieves a particular value for a performance metric (e.g., a good lap time), using a certain set of resources (e.g., a car having certain characteristics), on a particular game skill level, with particular track conditions (e.g., if track conditions are typically variable), then the challenge, when issued can include all of these challenge criteria so that the player receiving the challenge (the challenge recipient) can attempt to perform the same task as the first player under substantially the same conditions, and to better the performance metric achieved by the first player under those conditions. To facilitate this, the system may record various game parameters and/or performance metric values associated with the first user's performance, and transmit such criteria to the challenge recipient, along with a challenge invitation that invites the challenge recipient to attempt the challenge.

A system configured to provide for such competitive challenges may include a first computing platform associated with a first player (challenge issuer) and/or a second computing platform associated with a second player (challenge recipient). The first computing platform and/or the second computing platform may be separately configured to execute one or more a game module, a performance monitoring module, a challenge creation module, a challenge criteria module, a challenge customization module, a challenge communication module, a challenge access module, a challenge monitoring module, and/or other modules.

The game module may be configured to cause the first computing platform to generate a display, sounds, and/or haptic stimulation for the player that enables the player to experience a videogame, virtual world, and/or other digital environment. For example, if the videogame is a racing videogame, the game module may be configured to control the generation of sensory stimulation that mimics the sensory stimulation experienced during vehicular racing in real life. As such, the game module may include a physics engine, a rendering engine, and/or other information, instructions, and/or modules configured to generate the sensory stimulation associated with the videogame. The game module may be configured to receive control input, and to adjust the display, sounds, haptic stimulation, and/or other stimulation generated for the player in accordance with parameters dictated by the videogame.

The performance monitoring modules may be configured to quantify performance of a task by the players within the videogame. This may include determining values for a set of performance metrics characterizing the performance of the tasks by the players. The task may include an action, or set of actions, performed by the player in order to achieve an objective.

The performance metrics of a given task may include variables that quantify the performance of the given task by players of the videogame. Some non-limiting, examples of performance metrics for a task may include time to complete the task, points accumulated during the task, finishing position (e.g., leading or winner, first runner-up, second runner-up, and/or other finishing positions), accuracy (e.g., ratio of hits-to-shots taken, percentage of hits, and/or other accuracy parameters), number of opponents incapacitated, defeated, killed, robbed, avoided, and/or otherwise dealt with, power-ups collected, power-ups used, failures (e.g., lives lost, attempts, and/or other parameters reflecting failure), distance traveled, damage received, damage inflicted, number of allies providing assistance, and/or other parameters. The performance metrics for a performance of the given task may be measured and/or assigned values by the performance monitoring modules during performance of the given task and/or after performance of the given task by the players within the videogame.

The challenge creation module of the first computing platform may be configured to create a challenge within the videogame under the direction of the first player. A challenge may include a set of challenge criteria (e.g., challenge metrics, challenge parameters, values for the challenge metrics and/or parameters, and/or other criteria). Completing the challenge may require completing the task associated with the challenge (as defined by the challenge parameters), under the same game parameters experienced by the first player, while equaling or exceeding the performance required by the values for the set of challenge metrics. The challenge parameters (e.g., the task and/or the game parameters) may correspond to the same parameters present when the first player completed the task. The challenge metrics for the task may correspond to performance metrics determined by the performance monitoring module. The challenge metrics for the task may include a subset of the performance metrics.

The values for the challenge metrics for a challenge may be determined based on a previous performance of the task associated with the challenge by the first player. For example, if the task includes completing a lap in a racing game, and one of the challenge metrics includes lap time, the value for lap time for the challenge may be the lap time achieved by the player.

The challenge creation module of the first computing platform may be configured such that the first player may be automatically prompted to create a challenge. The first player may be automatically prompted to create the challenge upon completion of a task, during performance of the task, and/or prior to commencement of the task. The challenge creation module may be configured such that the first player requests the creation of a challenge without prompting. The first player may request the creation of the challenge prior to attempting the task, during performance of the task, and/or the player may request the creation of the challenge subsequent to completing the task.

In creating a challenge, the challenge creation module of the first computing module may determine one or more players that are to receive the challenge, such as the second player. This may be accomplished, for example, via user selection. The challenge creation module of the first computing platform may be configured to present an interface to the first player through which the first player can select other players (e.g., the second player) that are to receive the challenge. The other players may be selected from a set of friends of the player, from a leaderboard, and/or from other lists.

The challenge criteria module of the first computing platform may be configured to associate challenge criteria with a challenge created by the first player via the challenge creation module. For example, the challenge creation module may associate challenge parameters with the challenge. The challenge parameters may be associated with the challenge based on a record of the task, the game parameters present during performance of the task by the first player, and/or other challenge parameters. These challenge parameters may include one or more parameters determined automatically (e.g., by the game module prior to performance of the task by the first player) and/or determined based on user-selection (e.g., by selection of the first player prior to performing the task). The record may have been created during, or just subsequent to, performance of the task by the first player. The record may be stored on the first computing platform, and/or on a server in operative communication with the first computing platform.

The challenge criteria module may associate challenge metrics with the challenge by assigning a subset of the performance metrics to the challenge as challenge metrics. The "subset" of the performance metrics assigned to the challenge as challenge metrics may include any one or more of the performance metrics, up to and including all of the performance metrics. The values of the challenge metrics for the challenge may correspond to the values for the performance metrics achieved by the first player during performance of the task.

The challenge criteria module may be configured such that the inclusion of one or more of the performance metrics in the challenge metrics is performed automatically (e.g., by static selection rule, based upon performance with respect to the different performance metrics, and/or otherwise selected). The challenge criteria module may be configured such that the inclusion of one or more of the performance metrics in the challenge metrics is performed based in user selection.

The challenge customization module of the first computing platform may be configured to customize the challenge. The customization provided by the challenge customization module may include editing a title of a challenge, adding, removing, and/or editing content associated with the challenge, and/or other customizations. The content added, removed, and/or edited may include one or more text, video, still images, audio, and/or other content.

The challenge communication module of the first computing platform may be configured to initiate transmission of a challenge invitation associated with the challenge to one or more other players (e.g., the second player). This may include initiating transmission of the challenge invitation to computing platform(s) associated with the one or more other players, such as the second computing platform. The challenge invitation may prompt the second player to attempt the challenge and/or may provide the challenge criteria associated with the challenge to the second computing platform.

The challenge communication module of the second computing platform may be configured to receive the challenge invitation transmitted from the first computing platform. The challenge communication module of the second computing platform may be configured to convey the challenge invitation to the second player.

The challenge access module of the second computing platform may be configured receive acceptance of the challenge from the second player. Responsive to acceptance of the challenge from the second player, the challenge access module may be configured to provide access to the challenge for the second player so that the second player can attempt to complete the task within the videogame.

It will be appreciated that in some cases, challenge criteria of a challenge may require access to content that has not previously been accessible to the second player within the videogame. The second player may not have played far enough into the game (e.g., through completing levels, acquiring skills, traveling to virtual locations, and/or otherwise accessing content within the game) to reach content required by the challenge criteria with the challenge. Similarly, the second player may not have acquired equipment, skills, content, allies, and/or other resources that form part of the definition of the task. This may result in content associated with the challenge being "locked" to the second player upon receipt and acceptance of the challenge. For example, within a racing game, the second player may not have unlocked a racetrack, a car, and/or other content. Within a fighting game, the second player may not have unlocked a battle or fight venue, a weapon, a boss fight, and/or other content. Other examples also exist. In cases where the second player has unlocked all of the content associated with a challenge, the second player may not have unlocked the content at a difficulty setting corresponding to the challenge. For instance, the second player may have unlocked the content while playing on an easy setting, while the task definition associated with the challenge may require a difficulty setting to be higher (e.g., more difficult).

The challenge access module of the second computing platform may be configured to provide temporary access to locked videogame content, in response to the challenge criteria associated with the accepted challenge requiring videogame content not previously unlocked by the second player. The locked videogame content may include, without limitation, a venue, a vehicle, an aircraft, a watercraft, a pet, a weapon, a virtual opponent, a virtual teammate or ally, and/or other content.

The challenge access module of the second computing platform may be configured to adjust an interface provided to the player during performance of the challenge. This may include providing a specialized interface that enables the player to track progress toward completing the challenge through performance of the task.

As the second player attempts the challenge, the performance monitoring module of the second computing platform may monitor performance of the second player during an attempt of the challenge. This may include determining values of performance metrics during the attempt of the challenge. The performance metrics include the challenge metrics of the challenge being attempted.

The challenge monitoring module of the second computing platform may be configured to determine whether the second player has achieved values for the challenge metrics that satisfy the challenge, and/or whether the second player has completed the challenge. The challenge monitoring module may make such determinations based on the values for the challenge metrics dictated by the challenge, and the values for the challenge metrics determined by the performance monitoring module of the second computing platform as the second player attempts the challenge.

As the second player completes the task associated with the challenge, the challenge monitoring module of the second computing platform may make a final determination as to whether or not the player has completed the challenge. This final determination may be the results of the challenge. Results of the challenge may be communicated to the player that issued the challenge (e.g., the first player), other players that received the challenge, a specified group of players (e.g., friends of the second player, friends of the first player, players that are friends of both the first and second players), and/or other players or groups of players. The results of the challenge may be communicated by the challenge communication module of the second computing platform.

Responsive to the second player completing the challenge, the challenge creation module of the second computing platform may be configured to create a re-challenge for the task associated with the challenge. The re-challenge may include some of the same, or substantially the same, challenge criteria as the challenge, and/or or may include changes to the challenge criteria. For example, the challenge parameters may remain the same, or may be incremented to a harder level (e.g., difficulty setting may be incremented up). The re-challenge may include new values for the challenge metrics, new or additional challenge metrics, and/or other alterations from the completed challenge criteria. As will be appreciated from the following, the creation of the re-challenge, and possibly further re-challenges, may result in an ongoing interaction between players that transpires as the players asynchronously attempt to match or best each other's performance. The asynchronous nature of this interaction, and the basis of challenges and/or re-challenges on previous player performance may facilitate interactive participation in the videogame between players despite of circumstances that have previously inhibited interactive play. For example, differences in schedules, differences in equipment (e.g., different gaming platforms), and/or other circumstances may be overcome.

A re-challenge may be created automatically by the challenge creation module of the second computing platform, or a re-challenge may be created based upon reception of user selection of a re-challenge. The re-challenge may be customized, adjusted, and/or configured by the second player in a manner similar to or the same as the customization, adjustment, and/or configuration of the original challenge by the first player (e.g., title, content, challenge criteria, and/or other elements may be customized, adjusted, and/or configured).

The challenge communication module of the second computing platform may be configured to initiate transmission of the re-challenge to the appropriate other players. For example, the challenge communication module may initiate transmission of the re-challenge to the first computing platform for presentation to the first player. The challenge communication module may initiate transmission of the re-challenge in a manner that is similar to or the same as the manner transmission of the original challenge was initiated by the challenge communication module of the first computing platform.

Upon receipt of the re-challenge at the first computing platform, the performance monitoring module, the challenge access module, and the challenge monitoring module of the first computing platform may operate to present the re-challenge to the first player. For example, the performance monitoring module, the challenge access module, and the challenge monitoring module of the first computing platform may operate in a manner similar to or the same as the operation of the performance monitoring module, the challenge access module, and the challenge monitoring module of the second computing platform in presenting the challenge to the second player. The challenge communication module of the first computing platform may communicate results of attempts to complete the re-challenge by the first player similar to communication of results of attempts of the second player to complete the challenge by the challenge communication module of the second computing platform.

Upon completion of the re-challenge by the first player, the first computing platform may be configured to create a new re-challenge. The new re-challenge may then be provided back to the second computing platform and/or other players. Thus, the challenges and re-challenges may become an ongoing, iterative interaction between the first player, the second player, and/or other players.

It will be appreciated that description of a player as being associated with a computing platform is not intended to limit the player's interaction with the videogame as described herein to a single computing platform. By virtue of a user profile that is portable between computing platforms (e.g., through portable storage media and/or networked platforms), a single player could participate as described herein through a plurality of different physical computing platforms. Similarly, the issuance and attempts of challenges and re-challenges between a plurality of players may be accomplished through a single computing platform, as the players access the game through different user profiles.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
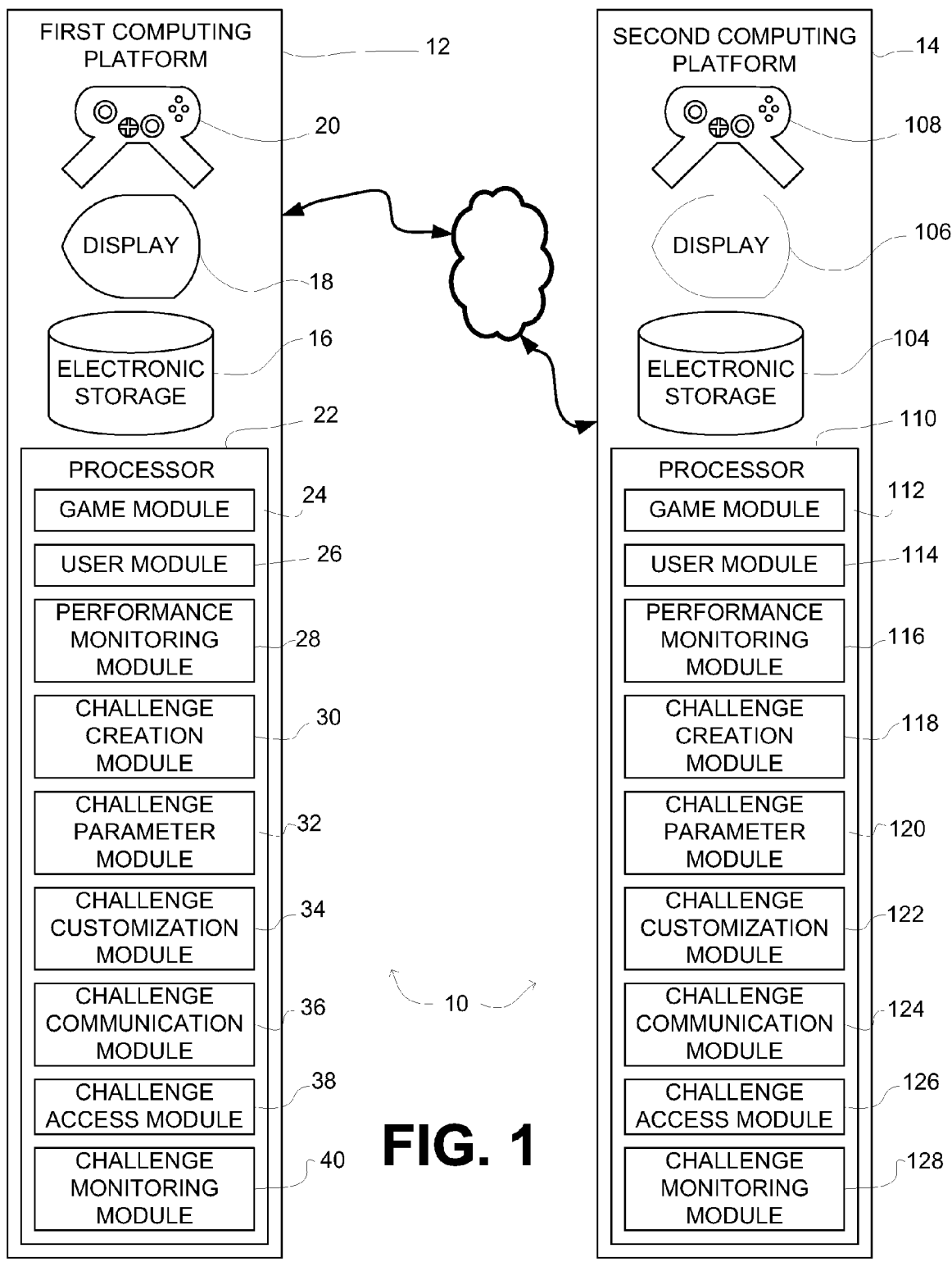
FIG. 1 illustrates a system configured to enable players to participate in competitive challenges within a videogame.

FIG. 1 illustrates a system 10 configured to enable players to participate in competitive challenges within a videogame. The challenges may enable players to compete against each other within the videogame while still participating in the videogame in an asynchronous manner through user-defined challenges. The challenges may be defined by challenge criteria. The challenge criteria may include one or more challenge parameters, one or more challenge metrics, and/or other criteria. The challenge parameters may define a task (or tasks) to be performed as part of the challenge, the context of the task, the conditions during the task, the resources available in performing the task, the settings of the game during performance of the task, and/or other aspects of the challenge. The challenge metrics may include one or more performance metrics that characterize the performance of the task by players. The tasks may include, for example, one or more of a race, a battle, a fight, a musical performance (or simulated music performance), a puzzle, and/or other objectives or tasks. In some implementations, system 10 may include one or more of a first computing platform 12, a second computing platform 14, and/or other components.

The first computing platform 12 may include a game console, such as Xbox 360® game console, the PlayStation3® game console, the Wii® game console, and/or other game consoles. This is not intended to be limiting. In some implementations, first computing platform 12 may include one or more other consumer computing platforms, such as, a desktop computer, a laptop computer, a handheld computer, a personal gaming device, a NetBook, a SmartPhone, and/or other computing platforms. The first computing platform 12 may include one or more of electronic storage 16, an electronic display 18, a controller 20, one or more processors 22, and/or other components.

Electronic storage 16 may comprise electronic storage media that electronically stores information. The electronic storage media of electronic storage 16 may include one or both of system storage that is provided integrally (i.e., substantially non-removable) with first computing platform 12 and/or removable storage that is removably connectable to first computing platform 12 via, for example, a port (e.g., a USB port, a firewire port, etc.) or a drive (e.g., a disk drive, etc.). Electronic storage 16 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 16 may store software algorithms, information determined by processor 22, information received via controller 20, and/or other information that enables first computing platform 12 to function properly. Electronic storage 16 may be a separate component within first computing platform 12, or electronic storage 16 may be provided integrally with one or more other components of first computing platform 12 (e.g., processor 22).

The electronic display 18 may be configured to generate a visual display of views rendered by processor 22 and/or other components of first computing platform 12. The electronic display 18 may include one or more of a television, a monitor, a touchscreen, a projection screen and/or projector, and/or other electronic displays. Although electronic display 18 is illustrated in FIG. 1 as a single component, in some implementations electronic display 18 may include a plurality of separate displays cooperating to generate visual displays rendered by first computing platform 12 to provide the videogame to the user.

In some implementations, electronic display 18 may be associated with one or more sound production devices (e.g., speakers, amplifiers, and/or other sound production devices). The sound production devices (not shown) may be configured to produce sounds in accordance with the videogame and/or in coordination with the visual displays generated by electronic display 18. The one or more sound production devices may be provided integrally with electronic display 18 and/or separately from electronic display 18. The one or more sound production devices may be in operative communication with electronic display 18 and/or processor 22 to receive signals dictating the sounds generated by the sound production devices.

The controller 20 may be configured to enable a user to input control inputs to first computing platform 12. This may enable the user to control one or more aspects of the videogame being provided to the user by first computing platform 12, to control operation of one or more of the components of first computing platform 12 (e.g., power, volume, brightness, and/or other aspects of operation), and/or provide other types of interaction between the user and first computing platform 12. In order to enable the input of control inputs, controller 20 may include one or more of a switch, a button a knob, a lever, an analog stick, a position, velocity, and/or acceleration detector, a direction pad, a microphone, a keypad, a number pad, and/or other devices enabling the input of control inputs by the user. The controller 20 may include one or more feedback devices through which information is communicated to the user from first computing platform 12. By way of non-limiting example, controller 20 may include a tactile feedback device, a sound generating device, a visual display generating device, and/or other feedback devices. The controller 20 may be operatively linked for communication with one or more of electronic storage 16, electronic display 18, processor 22, and/or other components of first computing platform 12.

Processor 22 is configured to provide information processing capabilities in first computing platform 12. As such, processor 22 may include one or more of a digital processor, an analog processor, a digital circuit designed to process information, an analog circuit designed to process information, a state machine, and/or other mechanisms for electronically processing information. Although processor 22 is shown in FIG. 1 as a single entity, this is for illustrative purposes only. In some implementations, processor 22 may include a plurality of processing units. These processing units may be physically located within the same device, or processor 22 may represent processing functionality of a plurality of devices operating in coordination.

As is shown in FIG. 1, processor 22 may be configured to execute one or more computer program modules. The one or more computer program modules may include one or more of a game module 24, a user module 26, a performance monitoring module 28, a challenge creation module 30, a challenge criteria module 32, a challenge customization module 34, a challenge communication module 36, a challenge access module 38, a challenge monitoring module 40, and/or other modules. Processor 22 may be configured to execute modules 24, 26, 28, 30, 32, 34, 36, 38, and/or 40 by software; hardware; firmware; some combination of software, hardware, and/or firmware; and/or other mechanisms for configuring processing capabilities on processor 22.

It should be appreciated that although modules 24, 26, 28, 30, 32, 34, 36, 38, and 40 are illustrated in FIG. 1 as being co-located within a single processing unit, in implementations in which processor 22 includes multiple processing units, one or more of modules 24, 26, 28, 30, 32, 34, 36, 38, and/or 40 may be located remotely from the other modules. The description of the functionality provided by the different modules 24, 26, 28, 30, 32, 34, 36, 38, and/or 40 described below is for illustrative purposes, and is not intended to be limiting, as any of modules 24, 26, 28, 30, 32, 34, 36, 38, and/or 40 may provide more or less functionality than is described. For example, one or more of modules 24, 26, 28, 30, 32, 34, 36, 38, and/or 40 may be eliminated, and some or all of its functionality may be provided by other ones of modules 24, 26, 28, 30, 32, 34, 36, 38, and/or 40. As another example, processor 22 may be configured to execute one or more additional modules that may perform some or all of the functionality attributed below to one of modules 24, 26, 28, 30, 32, 34, 36, 38, and/or 40.

The game module 24 may be configured to first computing platform 12 to generate a display, sounds, and/or haptic stimulation for the player that enables the player to experience a videogame. For example, if the videogame is a racing videogame, game module 24 may be configured to control the generation of sensory stimulation that mimics the sensory stimulation experienced during vehicular racing in real life. As such, game module 24 may include a physics engine, a rendering engine, and/or other information, instructions, and/or modules configured to generate the sensory stimulation associated with the videogame. The game module 24 may be configured to receive control input (e.g., from controller 20), and to adjust the display, sounds, haptic stimulation, and/or other stimulation generated for the player in accordance with parameters dictated by the videogame. For example, game module 24 may cause an object (e.g., an avatar, a virtual vehicle, aircraft, watercraft, and/or other conveyance, and/or other objects) associated with and/or under control of the player to perform actions in accordance with control input received from the player. To perform the functionality of game module 24 described herein, game module 24 may execute an instance of the videogame, or game module 24 may execute a client application that accesses an instance of the videogame being executed remotely from game module 24 on a server.

The user module 26 may be configured to access and/or manage one or more user profiles associated with players using first computing platform 12. The one or more user profiles may include information stored locally on first computing platform 12 and/or information stored remotely from first computing platform 12 (e.g., on a server). The user profiles may include, for example, information identifying the player (e.g., a username or handle, a number, an identifier, and/or other identifying information), security login information (e.g., a login code or password), game specific account information, subscription information, virtual currency account information (e.g., related to currency held in credit for the player), friend information (e.g., information related to friends of the player), game usage information, and/or other information related to the player.

The performance monitoring module 28 may be configured to quantify performance of a task by the player within the videogame. This may include determining values for a set of performance metrics characterizing the performance of the task by the player. The task may include an action, or set of actions, performed by the player in order to achieve an objective. For example, in a racing game, a task may include completing a portion of a race (e.g., a lap), completing a race, completing a tour (e.g., a collection of races), and/or other tasks. In a fighting and/or shooting game, a task may include defeating a certain opponent (or set of opponents), and/or other tasks. In a role-playing or strategy game, a task may include defeating a certain opponent (or set of opponents), conquering or controlling an area, exploring a place or set of places, and/or other tasks. In a platformer game, a task may include completing a level, clearing a level, and/or other tasks. It will be appreciated that this list of videogame genres and/or potential tasks is not intended to be limiting. For the purposes of this disclosure, a task may include any videogame activity in which a player performs one or more actions to achieve an objective.

The performance metrics of a given task may include variables that quantify the performance of the given task by players of the videogame. Some non-limiting, examples of performance metrics for a task may include time to complete the task, points accumulated during the task, finishing position (e.g., leading or winner, first runner-up, second runner-up, and/or other finishing positions), accuracy (e.g., ratio of hits-to-shots taken, percentage of hits, and/or other accuracy parameters), number of opponents incapacitated, defeated, killed, robbed, avoided, and/or otherwise dealt with, power-ups collected, power-ups used, failures (e.g., lives lost, attempts, and/or other parameters reflecting failure), distance traveled, damage received, damage inflicted, number of allies providing assistance, and/or other parameters. The performance metrics for a performance of the given task may be measured and/or assigned values by performance monitoring module 28 during performance of the given task and/or after performance of the given task by the player within the videogame. To determine values for the performance metrics, performance monitoring module 28 may monitor game module 24 during performance of the given task.

The challenge creation module 30 may be configured to create a challenge within the videogame under the direction of the player. A challenge may include a set of challenge criteria (e.g., challenge parameters, challenge metrics, values for challenge parameters and/or metrics, and/or other criteria). Completing the challenge may require completing the task associated with the challenge as defined by the challenge parameters, under the game parameters dictated by the challenge parameters, while equaling or exceeding the performance required by the values for the set of challenge metrics. The challenge parameters (e.g., the task and/or the game parameters) may correspond to the same parameters present when the player issuing the challenge completed the task. The challenge metrics for the task may correspond to performance metrics determined by performance monitoring module 28 during actual performance of the task by the player issuing the challenge. The challenge metrics for the task may include a subset of the performance metrics.

The values for the challenge metrics for a challenge may be determined based on a previous performance of the task associated with the challenge by the player creating the challenge. For example, if the task includes completing a lap in a racing game, and one of the challenge metrics includes lap time, the value for lap time for the challenge may be the lap time achieved by the player. As another example, if the task includes defeating a boss character, and one of the challenge metrics includes the duration of the fight, the value for fight duration for the challenge may be the duration of the fight in which the player defeated the boss character.

The challenge creation module 30 may be configured such that the player may be automatically prompted to create a challenge. The player may be automatically prompted to create the challenge upon completion of a task, during performance of the task, and/or prior to commencement of the task. The challenge creation module 30 may be configured such that the player requests the creation of a challenge without prompting. The player may request the creation of the challenge prior to attempting the task, during performance of the task, and/or the player may request the creation of the challenge subsequent to completing the task.

In creating a challenge, challenge creation module 30 may determine one or more players that are to receive the challenge. This may be accomplished, for example, via user selection. The challenge creation module 30 may be configured to present an interface to the player through which the player can select other players that are to receive the challenge. The other players may be selected from a set of friends of the player, from a leaderboard, and/or from other lists.

Figure 2:
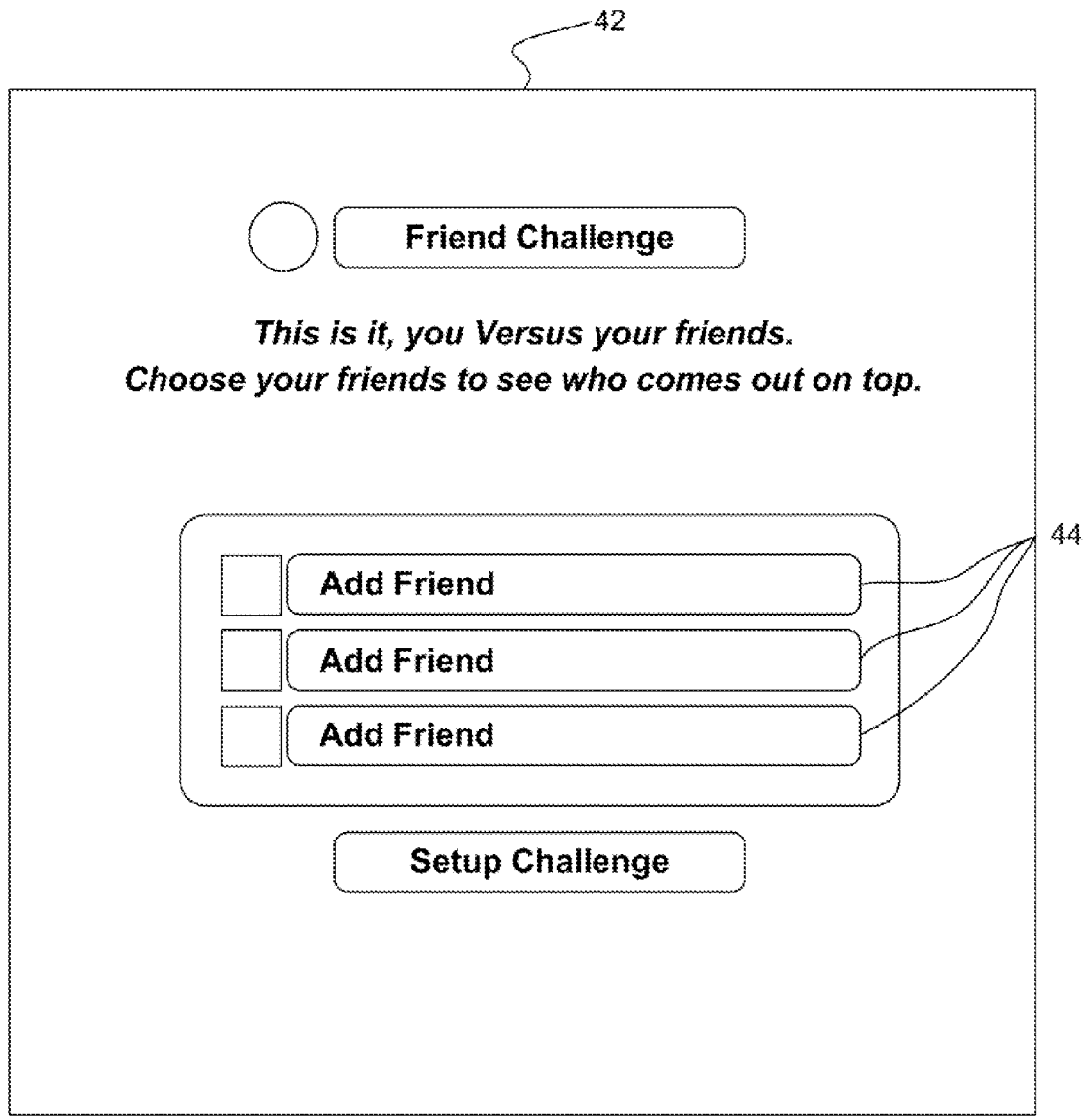
FIG. 2 illustrates an interface associated with a videogame.
Figure 3:
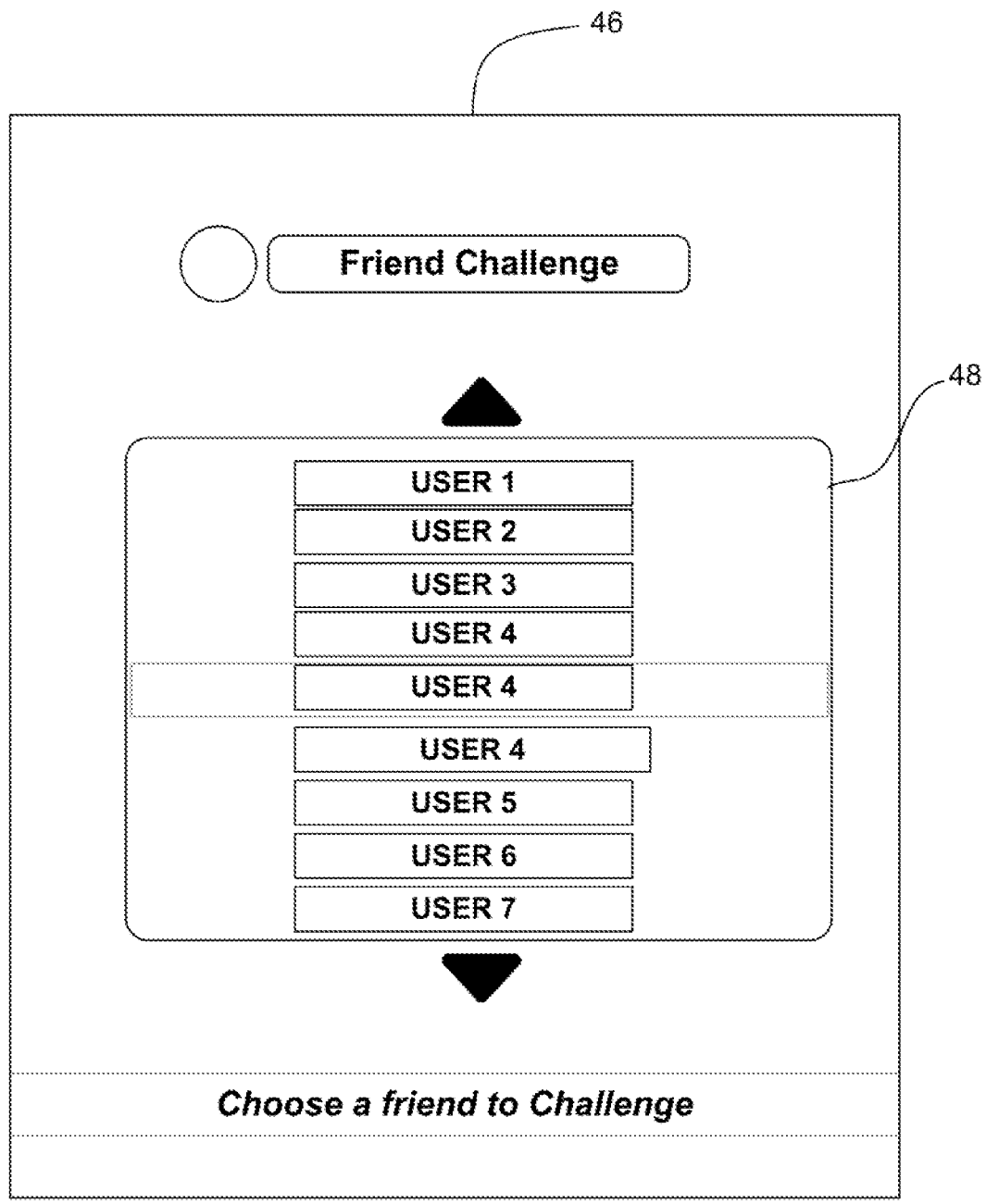
FIG. 3 illustrates an interface associated with a videogame.
Figure 4:
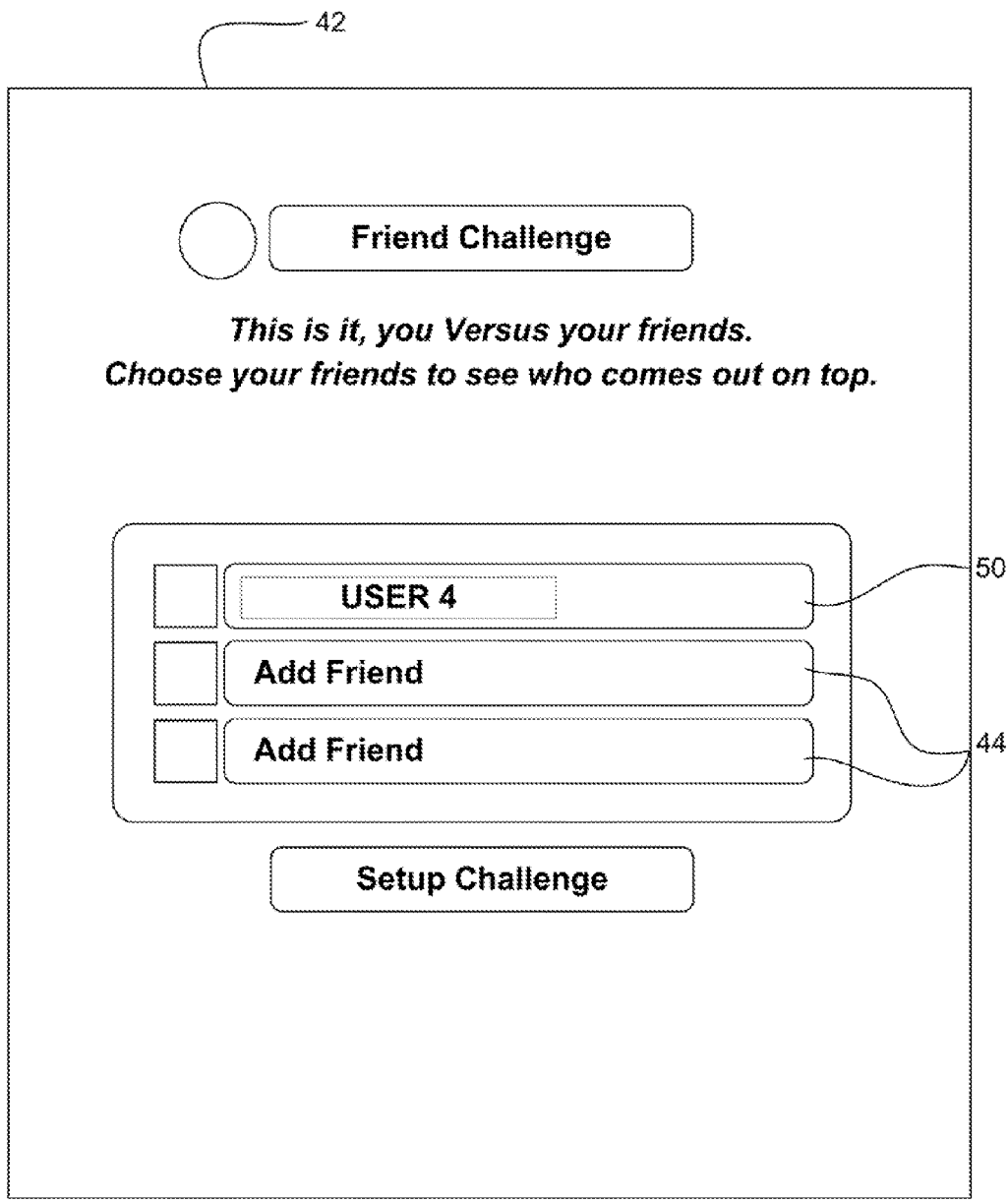
FIG. 4 illustrates an interface associated with a videogame.

By way of non-limiting example, FIGS. 2-4 illustrate selection by the player of other players to receive the challenge. In particular, FIG. 2 illustrates an interface 42 through which the player can select one or more other players. The interface may be presented to the player, for example, through an electronic display similar to or the same as electronic display 18 (shown in FIG. 1 and described above). The interface 42 may be configured to receive a control input from the player indicating that one of empty player slots 44 should be filled.

If such a control input is received, an interface 46 shown in FIG. 3 may be presented to the player. The interface 46 may be presented to the player, for example through an electronic display similar to or the same as electronic display 18 (shown in FIG. 1 and described above). The interface 46 may present a list 48 of other players to the user, and may be configured to receive selection of one of the players from list 48.

As is shown in FIG. 4, in response to selection of another player from a list similar to or the same as list 48 (shown in FIG. 3 and described above), the selected player may be inserted into one of empty player slots 44. For example, in FIG. 4, interface 42 includes the selected player inserted into filled slot 50.

The challenge criteria module 32 may be configured to associate challenge criteria with a challenge created by the player via challenge creation module 30. For example, the challenge criteria module 32 may associate challenge parameters with the challenge. The challenge parameters may be associated with the challenge based on a record of the task, the game parameters present during performance of the task by the first player, and/or other challenge parameters. These challenge parameters may include one or more parameters determined automatically (e.g., by game module 24 prior to performance of the task by the player creating the challenge) and/or determined based on user-selection (e.g., by selection of the player creating the challenge prior to performance of the task). The record may have been created before, during, or subsequent to, performance of the task by the player creating the challenge. The record may be stored on first computing platform 12, and/or on a server in operative communication with first computing platform 12.

The challenge criteria module 32 may associate challenge metrics with the challenge by assigning a subset of the performance metrics to the challenge as challenge metrics.

The "subset" of the performance metrics assigned to the challenge as challenge metrics may include any one or more of the performance metrics, up to and including all of the performance metrics. The values of the challenge metrics for the challenge may correspond to the values for the performance metrics achieved by the player during performance of the task.

The challenge criteria module 32 may be configured such that the inclusion of one or more of the performance metrics in the challenge metrics is performed automatically (e.g., by static selection rule, based upon performance with respect to the different performance metrics, and/or otherwise selected). The challenge criteria module 32 may be configured such that the inclusion of one or more of the performance metrics in the challenge metrics is performed based in user selection.

Figure 5:
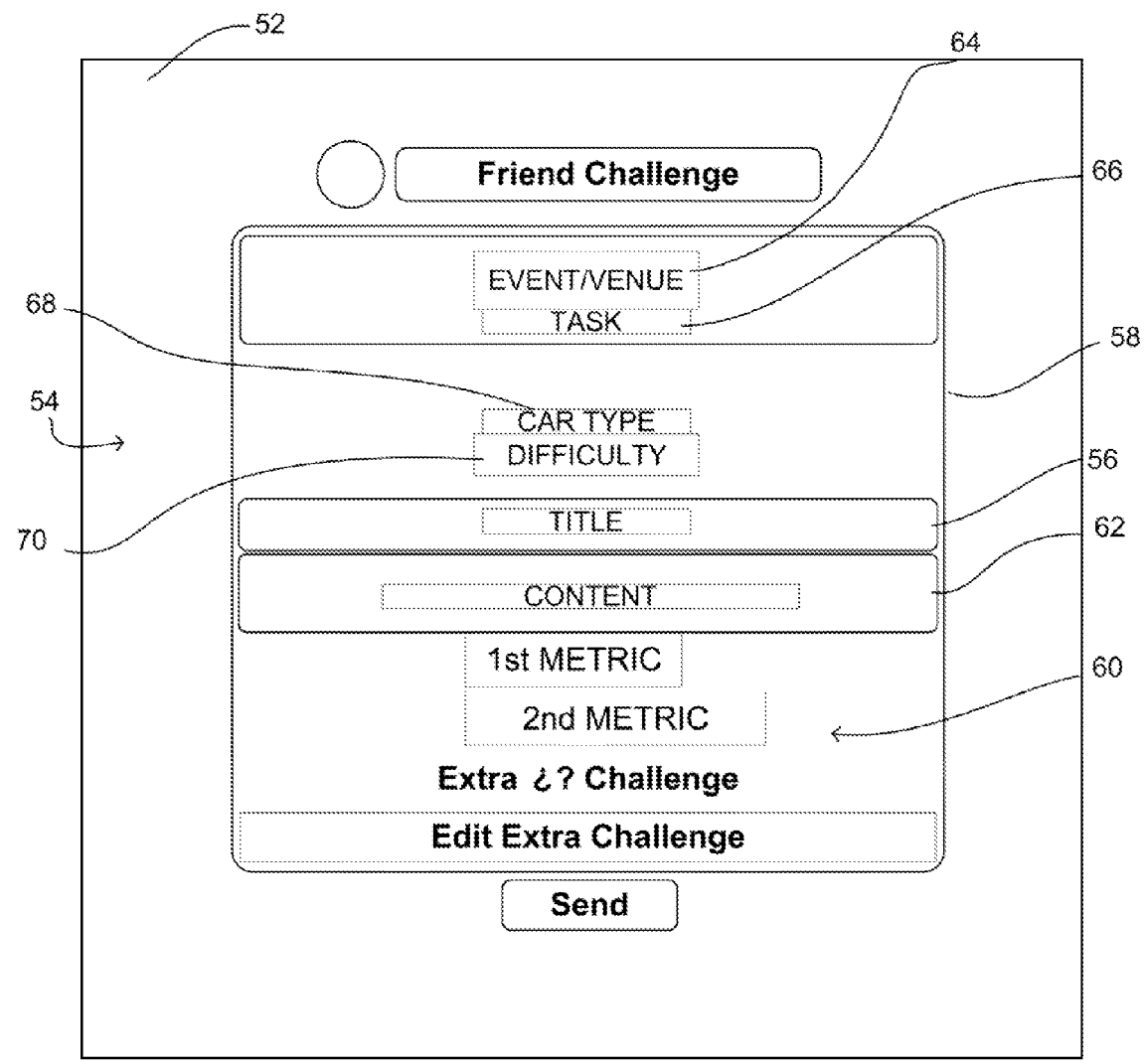
FIG. 5 illustrates an interface associated with a videogame.

FIG. 5 illustrates an interface 52 that displays a challenge 54 to the player. The interface 52 may be presented to the player, for example through an electronic display similar to or the same as electronic display 18 (shown in FIG. 1 and described above). As is shown in interface 52, challenge 54 may include one or more of a title 56, challenge parameters 58, a challenge metric list 60, content 62, and/or other components. The title 56 may provide some description of the task and/or challenge.

The challenge parameters 58 may define the task associated with the challenge. The challenge parameters 58 may define the task by identifying one or more elements of the task that characterize the task. By way of non-limiting example, challenge parameters 58 may identify one or more of a venue 64, an event or objective 66, equipment used 68, a difficulty setting 70, and/or other elements that characterize the task. These elements may correspond to the elements that were present as the player performed (or will be present as the player performs) the task.

The challenge metric list 60 may list the challenge metrics associated with challenge 54. The challenge metric list 60 may present the values for the challenge metrics associated with challenge 54. As was mentioned above, the values may be determined based on performance of the task associated with challenge 54 by the player. By way of non-limiting example, the challenge metrics may include a finishing position, a number of fans (or points, or dollars, or some other metric) earned during the task, and/or other challenge metrics. In the example shown in FIG. 5, challenge metric list 60 includes an extra slot 76, into which a user selected challenge metric may be inserted.

Figure 6:
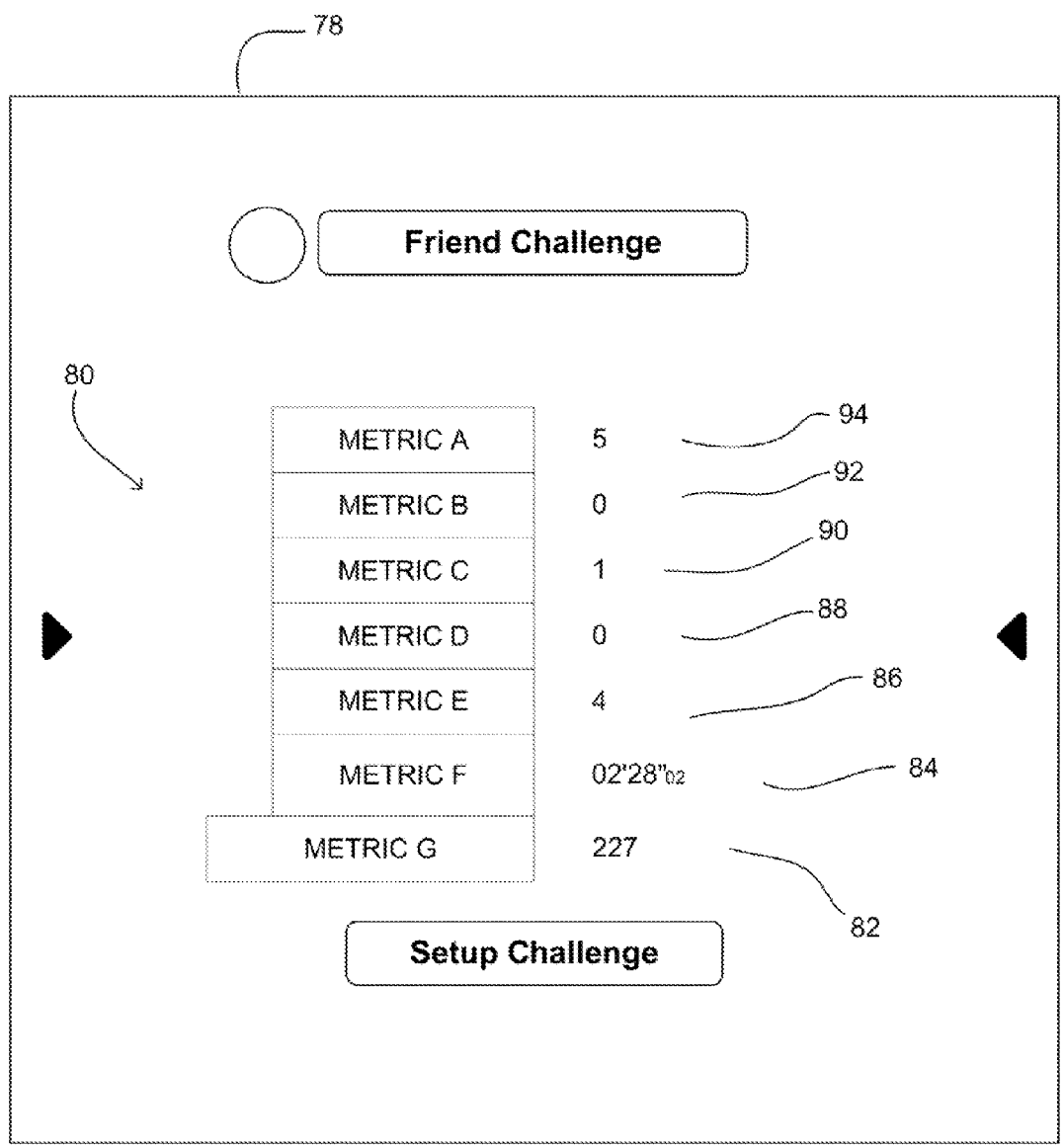
FIG. 6 illustrates an interface associated with a videogame.

The interface 52 may be configured to receive a request from the player to include another challenge metric in extra slot 76 in challenge metric list 60. Responsive to reception of such a request, an interface 78, as shown in FIG. 6, may be presented to the player. The interface 78 may be presented to the player, for example through an electronic display similar to or the same as electronic display 18 (shown in FIG. 1 and described above). The interface 78 may include a list of performance metrics 80 (illustrated including the following exemplary metrics: metric a 94, metric b 92, metric c 90, metric d 88, metric e 86, metric f 84, and metric g 82), which may be selected by the player for implementation as a challenge metric. For example, list of performance metrics 80 may include one or more of a score for the task, a time to complete the task, a number of speed boosts used during the task, a number of projectiles hit during the task, a number of stationary explosives hit during the task, a number of obstacles hit during the task, a number of shunts hit during the task, and/or other performance metrics. The interface 78 may be configured to receive a selection by the player of one or more of the performance metrics listed in list of performance metrics 80. Responsive to such selection, the selected one or more performance metrics may be included in a challenge. For example, responsive to receipt of a selection in interface 78 of metric e 86, metric e 86 may be included in a challenge similar to or the same as challenge 54 (shown in FIG. 5 and described above).

Figure 7:
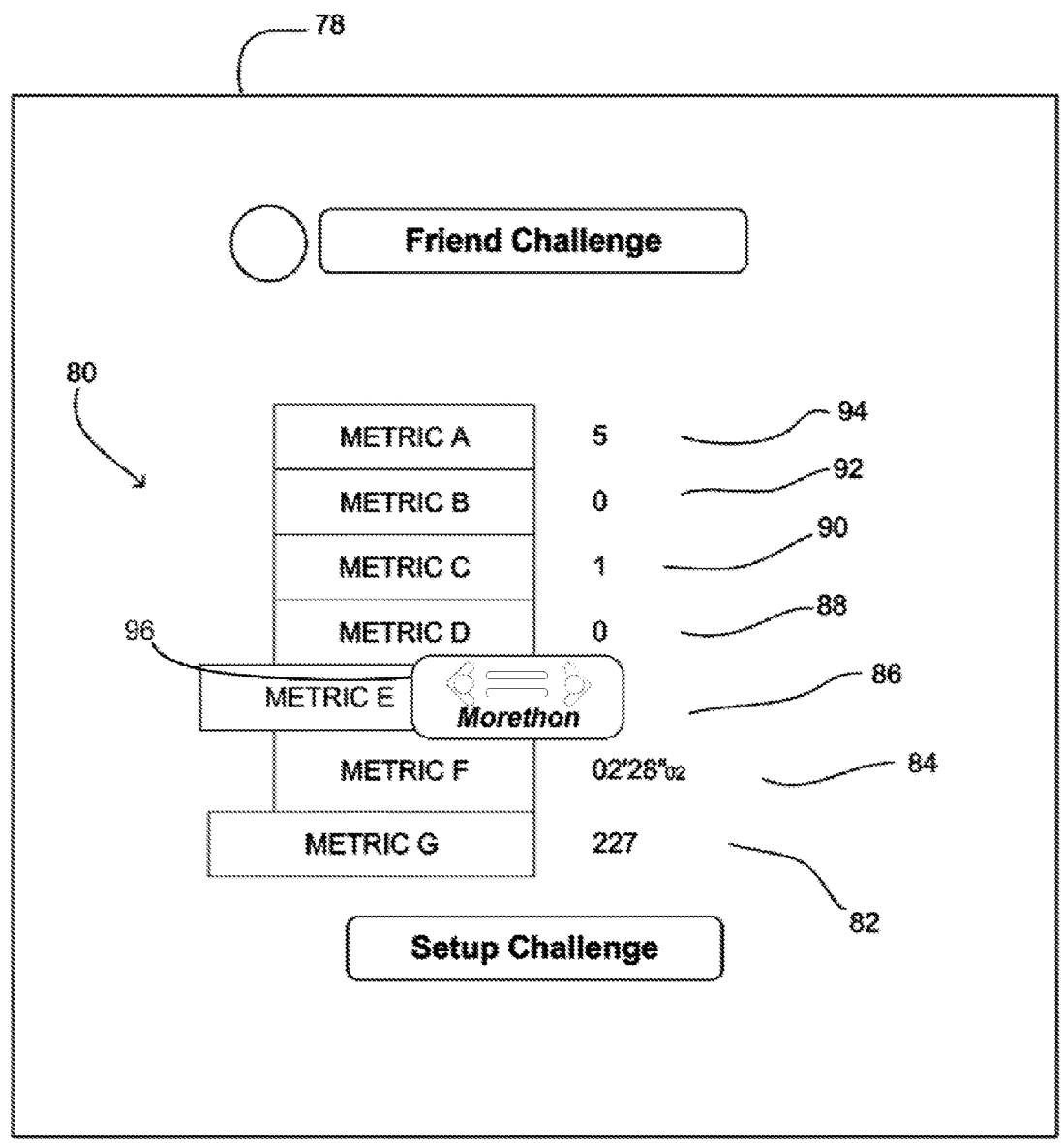
FIG. 7 illustrates an interface associated with a videogame.

Referring to FIG. 7, responsive to receipt of selection at interface 78 of a performance metric in a challenge as a challenge metric (e.g., metric e 86), interface 78 may be configured to receive a user selection as to whether the value for the selected performance metric should be used as an upper threshold or a lower threshold in determining whether a subsequent player has completed the challenge, of if the challenge should require an equivalent value for the selected performance metric. For example, responsive to receipt of a selection by the player that the value for the selected performance metric should be used as an upper threshold, the challenge requires other players to exceed the value for the selected performance metric. To receive user selection as to whether the value for the selected performance metric should be used as an upper threshold or a lower threshold, interface 78 may include a field 96 in which the user selection is received.

Figure 8:
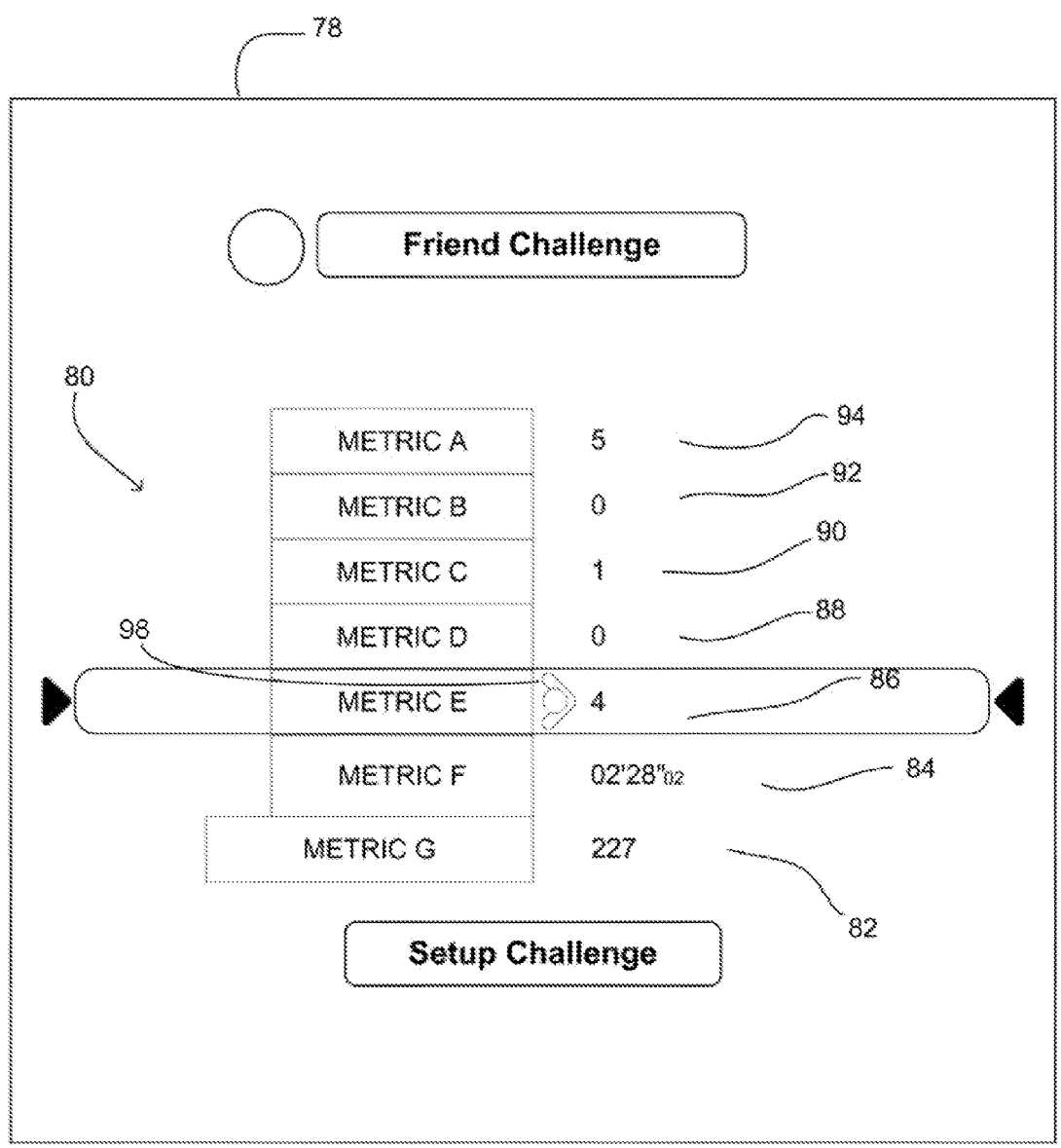
FIG. 8 illustrates an interface associated with a videogame.

Responsive to receipt of user selection by the player as to whether the value should be used as an upper or lower threshold, interface 78 may be configured to represent the selection. By way of illustration, FIG. 8 shows a view of interface 78 indicating receipt of a selection that metric e 86 should be included as a challenge metric, and that the value for number of speed boosts used 86 should be used as an upper threshold (e.g., the challenge requires use of a greater number of speed boosts). This is indication is given by indicator 98.

Figure 9:
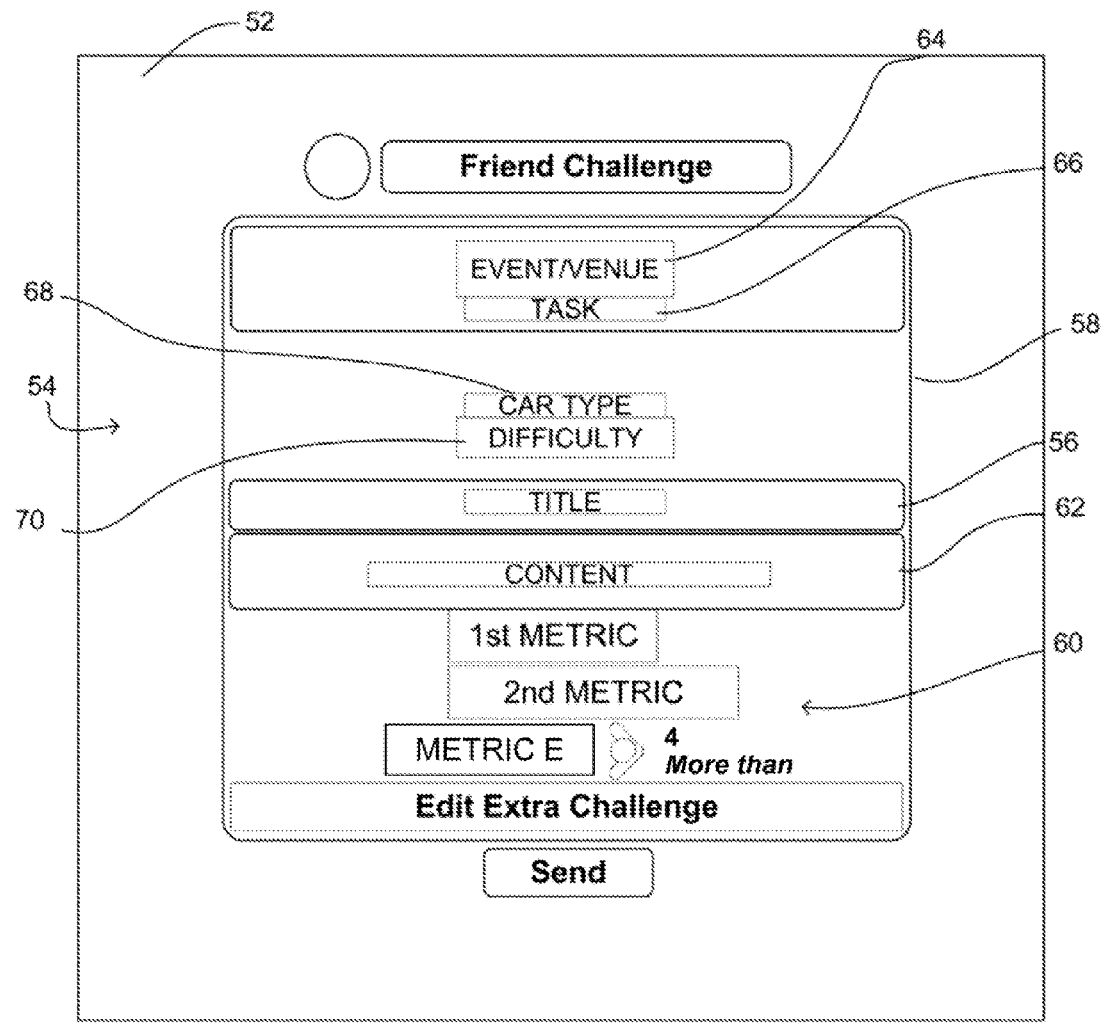
FIG. 9 illustrates an interface associated with a videogame.

Referring now to FIG. 9, interface 52 is shown, including the user selected challenge metric e 86 in challenge metric list 60. This indicates to other players attempting challenge 54 that number of speed boosts used 86 may be one of the challenge metrics for challenge 54.

Returning to FIG. 1, the challenge customization module 34 may be configured to customize the challenge. The customization provided by challenge customization module 34 may include editing a title of a challenge, adding, removing, and/or editing content associated with the challenge, and/or other customizations. The content added, removed, and/or edited may include one or more text, video, still images, audio, and/or other content.

Figure 10:
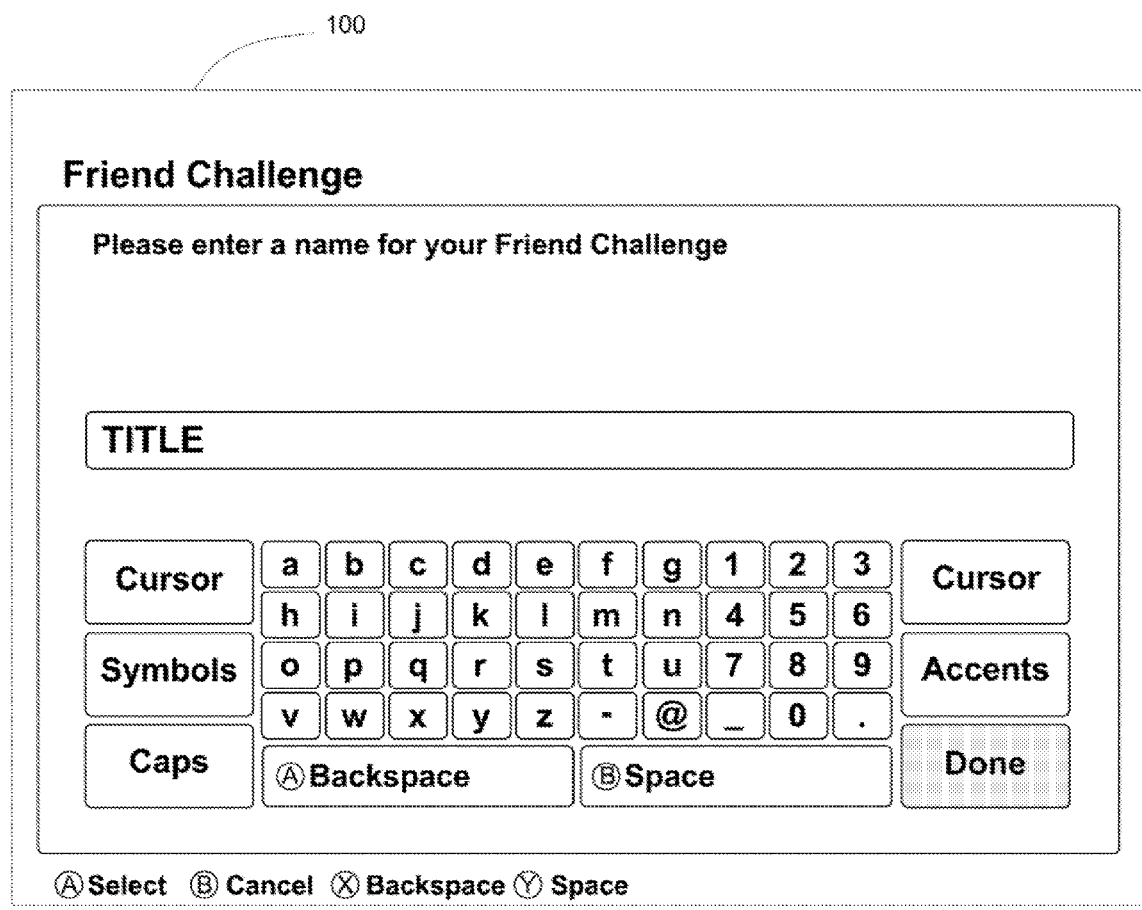
FIG. 10 illustrates an interface associated with a videogame.

By way of illustration, interface 52, shown in FIGS. 5 and 9, may be configured to receive user requests to customize challenge 54. For example, interface 52 may be configured to receive user selection of title 56 by the player. Turning to FIG. 10, responsive to reception of such user selection, an interface 100 may be presented to the player. The interface 100 may be presented to the player, for example through an electronic display similar to or the same as electronic display 18 (shown in FIG. 1 and described above). As can be seen in FIG. 10, interface 100 may be configured to receive customization of the title of the challenge.

Figure 11:
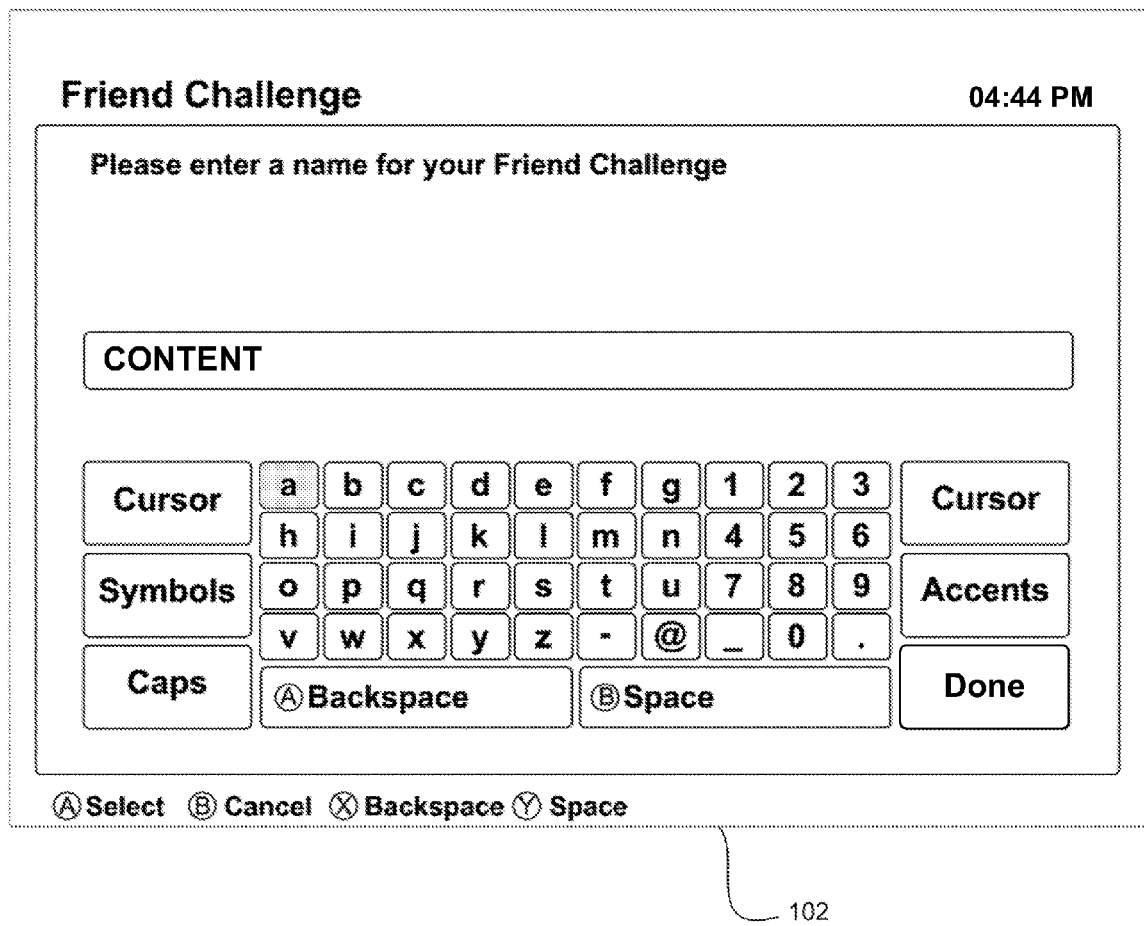
FIG. 11 illustrates an interface associated with a videogame.

Referring again to interface 52, shown in FIGS. 5 and 9, interface 52 may be configured to receive user selection of content 62. Turning to FIG. 11, responsive to reception of such user selection of content 62 by the player, an interface 102 may be presented to the player. The interface 102 may be presented to the player, for example through an electronic display similar to or the same as electronic display 18 (shown in FIG. 1 and described above). The interface 102 may be configured to receive customization of content associated with the challenge. It will be appreciated that the illustration of interface 102 as being configured to receive customization of textual content is not intended to be limiting. One or more interfaces may be presented to the player configured to receive customization of a challenge in the form of audio, video, and/or still image content to be associated with the challenge.

Returning to FIG. 1, the challenge communication module 36 may be configured to initiate transmission of a challenge invitation associated with the challenge to one or more other players. This may include initiating transmission of the challenge invitation to computing platform(s) associated with the one or more other players. For example, challenge communication module 36 may initiate transmission of the challenge invitation from first computing platform 12 to second computing platform 14. The challenge invitation may prompt the player receiving the challenge to attempt the challenge and/or may provide the challenge criteria associated with the challenge to second computing platform 14.

The transmission of the challenge invitation may be accomplished via a network, a dedicated line, an electronic message, a micro-blogging service (e.g., as provided by Twitter®, and/or other micro-blogging services), a social network (e.g., as provided by Facebook®, MySpace™, and/or other social networks), a gaming first party communication system (e.g., as provided by Xbox® Live, Sony® Home, and/or other gaming first party communication systems), and/or other communication media. The challenge communication module 36 may be configured to initiate transmission of the challenge invitation without requiring the player to "leave" the videogame provided by game module 24 and/or the control environment associated therewith (e.g., as illustrated in FIGS. 2-11).

The media of communication implemented to transmit the challenge invitation from first computing platform 12 to second computing platform 14 may include communication media that is not specific to a particular type of computing platform. For example, a micro-blogging service, a social network, and/or communication media may be platform type agnostic. This may enable challenges to be transmitted and/or accepted between players that participate in the videogame on different platform types. For example, first computing platform 12 may include a first type of gaming console while second computing platform 14 may include second type of gaming console. As another example, one or the other of first computing platform 12 or second computing platform 14 may include a personal computer (e.g., desktop, laptop, or other personal computer). Types of gaming consoles may include, for example, Nintendo® Wii®, Nintendo® DS®, Sony® PlayStation® PSP, Sony® PlayStation® 2, Sony® PlayStation® 3, Microsoft® Xbox® 360, and/or other gaming console types.

The second computing platform 14 may include a game console, such as Xbox 360® game console, the PlayStation3® game console, the Wii® game console, and/or other game consoles. This is not intended to be limiting. In some implementations, second computing platform 14 may include one or more other consumer computing platforms, such as, a desktop computer, a laptop computer, a handheld computer, a personal gaming device, a NetBook, a SmartPhone, and/or other computing platforms. second computing platform 14 may include one or more of electronic storage 104, an electronic display 106, a controller 108, one or more processors 110, and/or other components.

Electronic storage 104 may comprise electronic storage media that electronically stores information. The electronic storage media of electronic storage 104 may include one or both of system storage that is provided integrally (i.e., substantially non-removable) with second computing platform 14 and/or removable storage that is removably connectable to second computing platform 14 via, for example, a port (e.g., a USB port, a firewire port, etc.) or a drive (e.g., a disk drive, etc.). Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 104 may store software algorithms, information determined by processor 110, information received via controller 108, and/or other information that enables second computing platform 14 to function properly. Electronic storage 104 may be a separate component within second computing platform 14, or electronic storage 104 may be provided integrally with one or more other components of second computing platform 14 (e.g., processor 110).

The electronic display 106 may be configured to generate a visual display of views rendered by processor 110 and/or other components of second computing platform 14. The electronic display 18 may include one or more of a television, a monitor, a touchscreen, a projection screen and/or projector, and/or other electronic displays. Although electronic display 106 is illustrated in FIG. 1 as a single component, in some implementations electronic display 106 may include a plurality of separate displays cooperating to generate visual displays rendered by second computing platform 14 to provide the videogame to the user.

In some implementations, electronic display 106 may be associated with one or more sound production devices (e.g., speakers, amplifiers, and/or other sound production devices). The sound production devices (not shown) may be configured to produce sounds in accordance with the videogame and/or in coordination with the visual displays generated by electronic display 106. The one or more sound production devices may be provided integrally with electronic display 106 and/or separately from electronic display 106. The one or more sound production devices may be in operative communication with electronic display 106 and/or processor 110 to receive signals dictating the sounds generated by the sound production devices.

The controller 108 may be configured to enable a user to input control inputs to second computing platform 14. This may enable the user to control one or more aspects of the videogame being provided to the user by second computing platform 14, to control operation of one or more of the components of second computing platform 14 (e.g., power, volume, brightness, and/or other aspects of operation), and/or provide other types of interaction between the user and second computing platform 14. In order to enable the input of control inputs, controller 108 may include one or more of a switch, a button a knob, a lever, an analog stick, a position, velocity, and/or acceleration detector, a direction pad, a microphone, a keypad, a number pad, and/or other devices enabling the input of control inputs by the user. The controller 108 may include one or more feedback devices through which information is communicated to the user from second computing platform 14. By way of non-limiting example, controller 108 may include a tactile feedback device, a sound generating device, a visual display generating device, and/or other feedback devices. The controller 108 may be operatively linked for communication with one or more of electronic storage 104, electronic display 106, processor 110, and/or other components of second computing platform 14.

Processor 110 is configured to provide information processing capabilities in second computing platform 14. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may include a plurality of processing units. These processing units may be physically located within the same device, or processor 110 may represent processing functionality of a plurality of devices operating in coordination.

As is shown in FIG. 1, processor 110 may be configured to execute one or more computer program modules. The one or more computer program modules may include one or more of a game module 112, a user module 114, a performance monitoring module 116, a challenge creation module 118, a challenge criteria module 120, a challenge customization module 122, a challenge communication module 124, a challenge access module 126, a challenge monitoring module 128, and/or other modules. Processor 110 may be configured to execute modules 112, 114, 116, 118, 120, 122, 124, 126, and/or 128 by software; hardware; firmware; some combination of software, hardware, and/or firmware; and/or other mechanisms for configuring processing capabilities on processor 110.

It should be appreciated that although modules 112, 114, 116, 118, 120, 122, 124, 126, and 128 are illustrated in FIG. 1 as being co-located within a single processing unit, in implementations in which processor 110 includes multiple processing units, one or more of modules 112, 114, 116, 118, 120, 122, 124, 126, and/or 128 may be located remotely from the other modules. The description of the functionality provided by the different modules 112, 114, 116, 118, 120, 122, 124, 126, and/or 128 described below is for illustrative purposes, and is not intended to be limiting, as any of modules 112, 114, 116, 118, 120, 122, 124, 126, and/or 128 may provide more or less functionality than is described. For example, one or more of modules 112, 114, 116, 118, 120, 122, 124, 126, and/or 128 may be eliminated, and some or all of its functionality may be provided by other ones of modules 112, 114, 116, 118, 120, 122, 124, 126, and/or 128. As another example, processor 110 may be configured to execute one or more additional modules that may perform some or all of the functionality attributed below to one of modules 112, 114, 116, 118, 120, 122, 124, 126, and/or 128.

The game module 112, user module 114, and performance monitoring module 116 of processors 110 operate in substantially the same manner as game module 24, user module 26, and performance monitoring module 28 of processor 22, respectively. As such, a separate description of the functionality of modules game module 112, user module 114, and performance monitoring module 116 will not be provided herein in detail.

Figure 12:
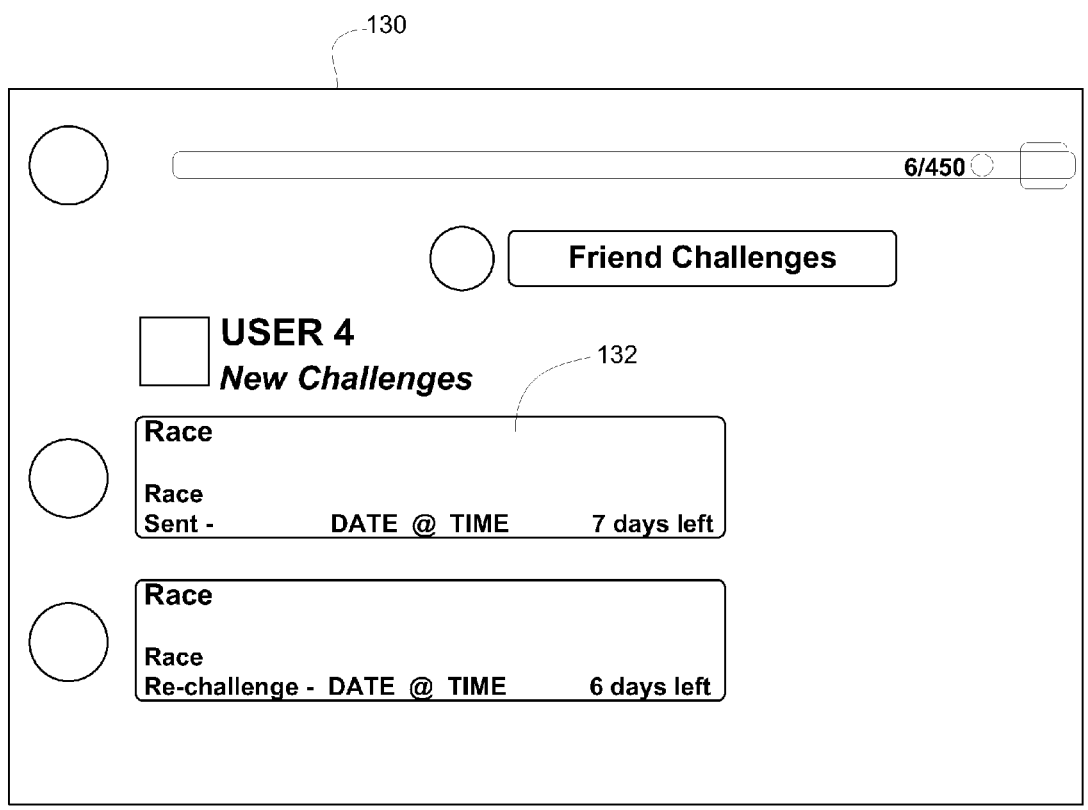
FIG. 12 illustrates an interface associated with a videogame.

The challenge communication module 124 may be configured to receive the challenge invitation transmitted from first computing platform 12. The challenge communication module 124 may be configured to convey the challenge invitation to the player associated with second computing platform 14. For example, FIG. 12 illustrates an interface 130 configured to convey the challenge invitation to the player associated with second computing platform 14. The interface 130 may be presented to the player, for example through an electronic display similar to or the same as electronic display 106 (shown in FIG. 1 and described above). The interface 130 may present the challenge invitation 132 to the player. The interface 130 may be configured to receive a user selection of challenge invitation 132 by the player. Responsive to challenge invitation 132 by the player, the player may be given the opportunity to attempt the challenge associated with challenge invitation 132, save challenge invitation 132 for a later attempt, reject challenge invitation 132, and/or take other actions with respect to challenge invitation 132.

The representation of challenge invitation 132 in FIG. 12 is not intended to be limiting. The challenge invitation 132 conveyed to the player via, for example, electronic display 106 may include content associated with the challenge, challenge metric(s) associated with the challenge, value(s) for the challenge metric(s) associated with the challenge, a definition of the task associated with the challenge, and/or other challenge criteria.

The challenge access module 126 may be configured receive acceptance of the challenge from the player (e.g., through interface 130 shown in FIG. 12 and described above). Responsive to acceptance of the challenge from the player, challenge access module 126 may be configured to provide access to the challenge for the player so that the player can attempt to complete the task within the videogame. This may include prompting game module 112 to present the task to the player so that the player can attempt to complete the task.

It will be appreciated that in some cases, challenge criteria of a received challenge may require access to content that has not previously been accessible to the player within the videogame. The player may not have played far enough into the game (e.g., through completing levels, acquiring skills, traveling to virtual locations, and/or otherwise accessing content within the game) to reach content required by the challenge criteria of the challenge. Similarly, the player may not have acquired equipment, skills, content, allies, and/or other resources that form part of the task definition. This may result in content associated with the challenge being "locked" to the player upon receipt and acceptance of the challenge. For example, within a racing game, a player may not have unlocked a racetrack, a car, and/or other content. Within a fighting game, a player may not have unlocked a battle or fight venue, a weapon, a boss fight, and/or other content. Other examples also exist. In cases where the player has unlocked all of the content associated with a challenge, the player may not have unlocked the content at a difficulty setting corresponding to the challenge. For instance, the player may have unlocked the content while playing on an easy setting, while the task definition associated with the challenge may require a difficulty setting to be higher (e.g., more difficult).

The challenge access module 126 may be configured to provide temporary access to locked videogame content, in response to the challenge criteria associated with the accepted challenge requiring videogame content not previously unlocked by the accepting player. The locked videogame content may include, without limitation, a venue, a vehicle, an aircraft, a watercraft, a pet, a weapon, a virtual opponent, a virtual teammate or ally, and/or other content.

Figure 13:
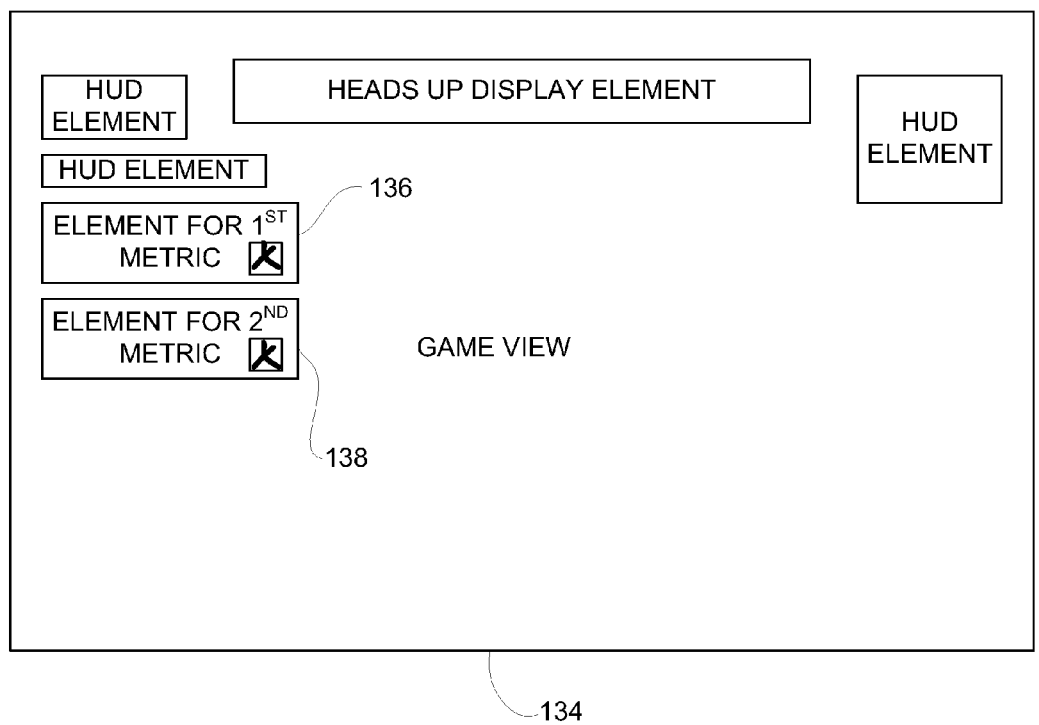
FIG. 13 illustrates an interface associated with a videogame.
Figure 14:
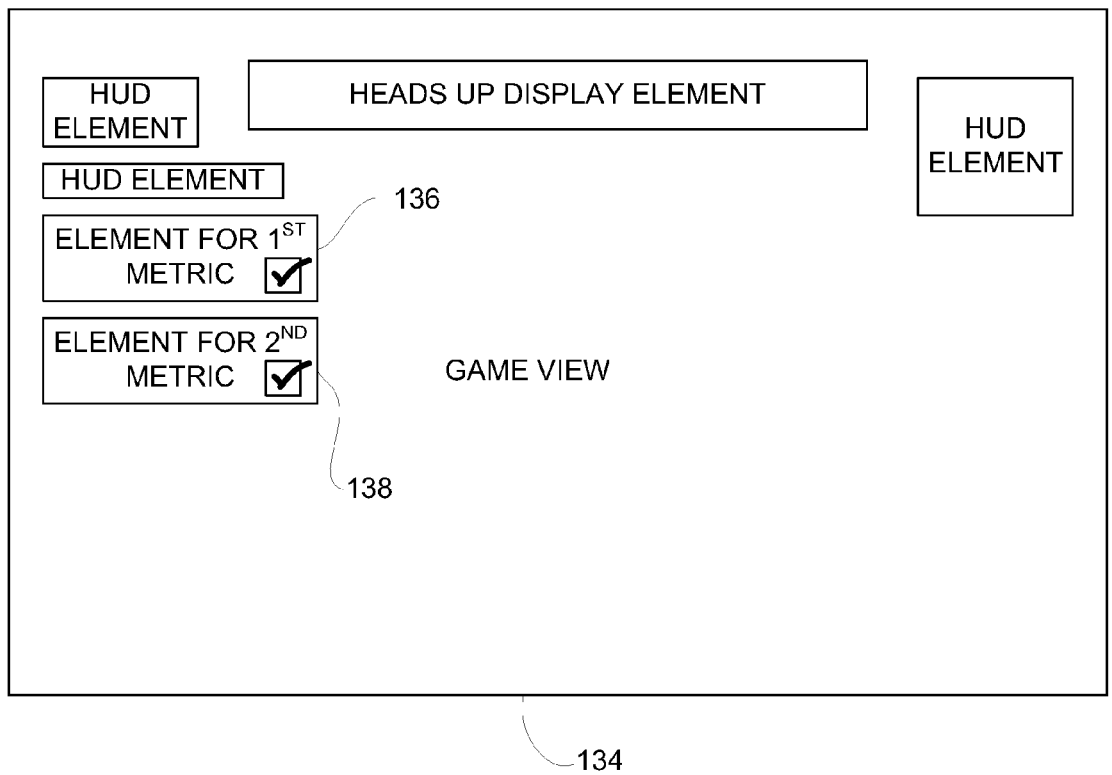
FIG. 14 illustrates an interface associated with a videogame.

The challenge access module 126 may be configured to adjust an interface provided to the player during performance of the challenge. This may include providing a specialized interface that enables the player to track progress toward completing the challenge through performance of the task. By way of illustration, FIG. 13 shows a view 134 presented to the player that includes the videogame task associated with the challenge (in this case a car race). The view 134 may include visual elements 136 and 138. Visual elements 136 and 138 may correspond to challenge metrics associated with the challenge. Prior to achieving values for the challenge metrics that satisfy the challenge, visual elements 136 and 138 may include an icon indicating non-compliance with the challenge (e.g., the x's shown in FIG. 13). Referring to FIG. 14, upon achieving values for the challenge metrics that satisfy the challenge, visual elements 136 and 138 may be adjusted as shown to indicate compliance with the challenge (e.g., the check marks shown in FIG. 14).

Returning to FIG. 1, as the player attempts the challenge, performance monitoring module 116 may monitor performance of the player. This may include determining values of performance metrics, as was described above with respect to performance monitoring module 28. The performance metrics include the challenge metrics of the challenge being attempted.

The challenge monitoring module 128 may be configured to determine whether the player has achieved values for the challenge metrics that satisfy the challenge, and/or whether the player has completed the challenge. The challenge monitoring module 128 may make such determinations based on the values for the challenge metrics dictated by the challenge, and the values for the challenge metrics determined by performance monitoring module 116 as the player attempts the challenge.

As the player completes the task associated with the challenge, the challenge monitoring module 128 may make a final determination as to whether or not the player has completed the challenge. This final determination may be the results of the challenge. Results of the challenge may be communicated to the player that issued the challenge (e.g., the player associated with first computing platform 12), other players that received the challenge, a specified group of players (e.g., friends of the player completing the challenge, friends of the player that issued the challenge, players that are friends of both the player completing the challenge and friends of the player that issued the challenge), and/or other players or groups of players. The results of the challenge may be communicated by challenge communication module 124.

Responsive to the player completing the challenge, challenge creation module 118 may be configured to create a re-challenge for the task associated with the challenge. The re-challenge may include the same, or substantially the same, challenge criteria, or may include changes to the challenge criteria. For example, challenge parameters may remain the same, or may be incremented to a harder level (e.g., difficulty setting may be incremented up), or otherwise changed. The re-challenge may include new values for the challenge metrics, new or additional challenge metrics, and/or other alterations from the completed challenge. As will be appreciated from the following, the creation of the re-challenge, and possibly further re-challenges, may result in an ongoing interaction between players that transpires as the players asynchronously attempt to match or best each other's performance. The asynchronous nature of this interaction, and the basis of challenges and/or re-challenges on previous player performance may facilitate interactive participation in the videogame between players as the players attempt to "one up" each other, despite of circumstances that have previously inhibited interactive play. For example, differences in schedules, differences in equipment (e.g., different gaming platforms), and/or other circumstances may be overcome.

Figure 15:
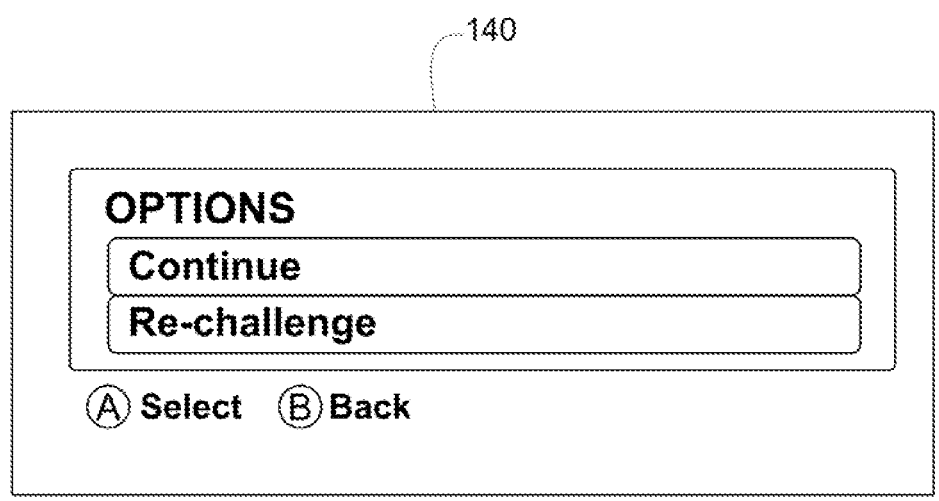
FIG. 15 illustrates an interface associated with a videogame.

A re-challenge may be created automatically by challenge creation module 118, or a re-challenge may be created based upon reception of user selection of a re-challenge. By way of illustration, FIG. 15 illustrates an interface 140 configured to receive selection, by the player that completed the challenge, of a re-challenge. The interface 140 may be presented to the player, for example through an electronic display similar to or the same as electronic display 106 (shown in FIG. 1 and described above). In creating the re-challenge, interface 140 and/or some other interface may be configured to receive user selection of the other players that should receive the re-challenge. This may include all of the players that received the original challenge and/or the player that created the original challenge, and/or other players.

Figure 16:
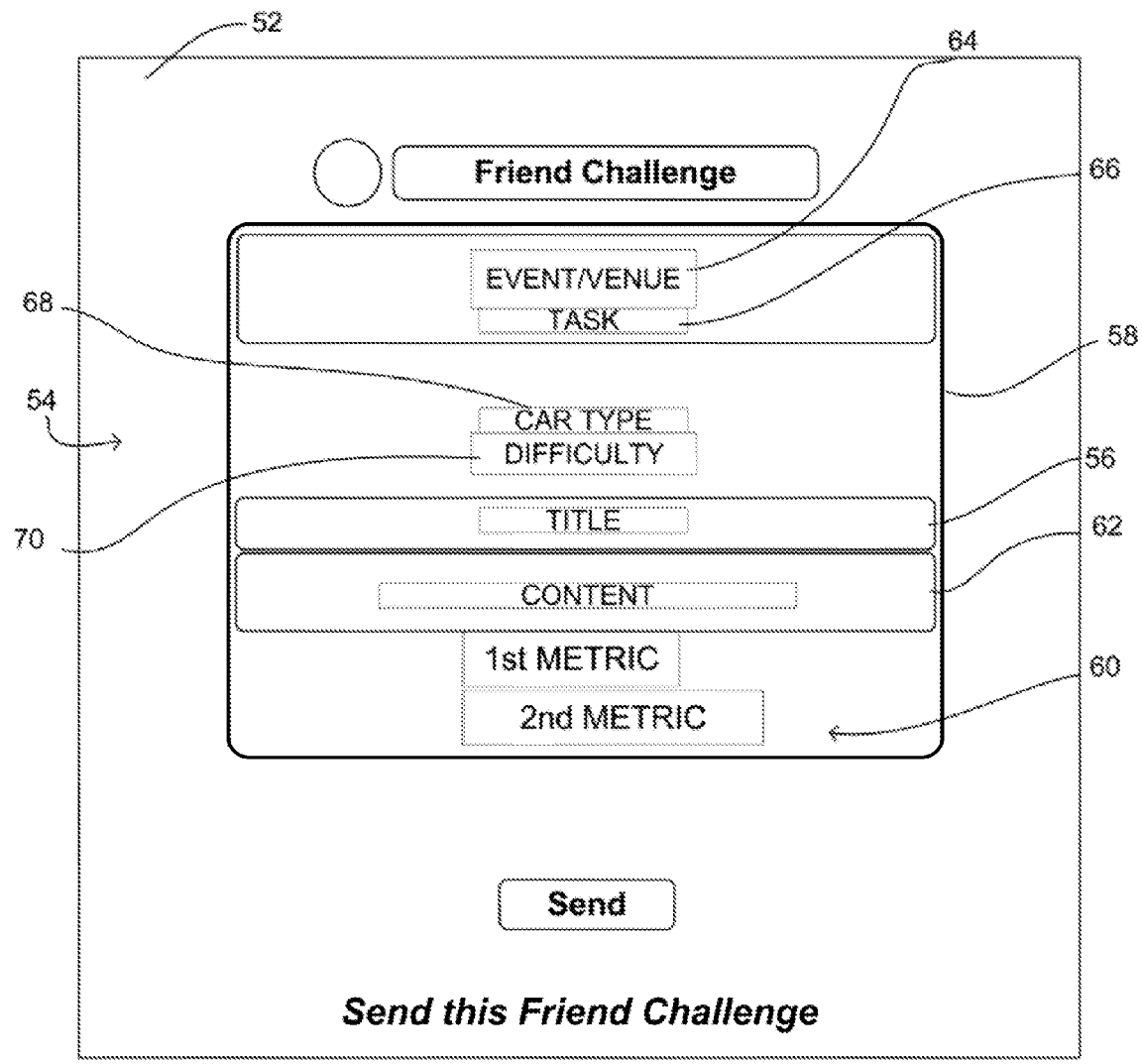
FIG. 16 illustrates an interface associated with a videogame.

FIG. 16 illustrates an interface 142 configured to present a re-challenge 144 to the player that completed the challenge. The interface 142 may be presented to the player, for example through an electronic display similar to or the same as electronic display 106 (shown in FIG. 1 and described above). The re-challenge 144 may include one or more of a title 146, challenge parameters 148, a challenge metric list 150, content 152, and/or other components. The values for the challenge metrics in challenge metric list 150 may be the values achieved by the player in completing the original challenge. The challenge parameters 148 may correspond (e.g., be the same as and/or incremented from) the challenge parameters of the original challenge.

One or more of the title 146, challenge parameters 148, challenge metric list 150, content 152, and/or other components of the re-challenge may be customized and/or configured by the player creating the re-challenge. The customization and/or configuration of one or more of title 146, challenge parameters 148, challenge metric list 150, content 152, and/or other components of the re-challenge may be accomplished in the same manner as the corresponding adjustment, customization, and/or configuration of a new challenge provided herein. For example, returning to FIG. 1, challenge criteria module 120 and/or challenge customization module 122 may operate in a manner that is similar to or the same as the operation of challenge customization module 34 and/or challenge communication module 36 in adjusting, customizing, and/or configuring a new challenge.

The challenge communication module 124 may be configured to initiate transmission of the re-challenge to the appropriate other players. The re-challenge may prompt the receiving players to attempt the re-challenge, and/or may provide at least some of the challenge criteria for the re-challenge to the computing platforms associated with the receiving players. For example, challenge communication module 124 may initiate transmission of the re-challenge to first computing platform 12 for presentation to the player associated with first computing platform 12. The challenge communication module 124 may initiate transmission of the re-challenge in a manner that is similar to or the same as the manner transmission of the original challenge was initiated by challenge communication module 36.

Upon receipt of the re-challenge at first computing platform 12, game module 24, performance monitoring module 28, challenge access module 38, and challenge monitoring module 40 may operate to present the re-challenge to the player associated with first computing platform 12. For example, game module 24, performance monitoring module 28, challenge access module 38, and challenge monitoring module 40 may operate in a manner similar to or the same as the operation of game module 112, performance monitoring module 116, challenge access module 126, and challenge monitoring module 128 in presenting the challenge to the player associated with second computing platform 14. The challenge communication module 36 may communicate results of attempts to complete the re-challenge similar to communication of results of attempts to complete the challenge by challenge communication module 124.

Upon completion of the re-challenge by the player associated with first computing platform 12, first computing platform 12 may be configured to create a new re-challenge. The new re-challenge may then be provided back to second computing platform 14 and/or other players. Thus, the challenges and re-challenges may become an ongoing, iterative interaction between the player associated with first computing platform 12, the player associated with second computing platform 14, and/or other players.

It will be appreciated that description of a player as being associated with a computing platform is not intended to limit the player's interaction with the videogame as described herein to a single computing platform. By virtue of a user profile that is portable between computing platforms (e.g., through portable storage media and/or networked platforms), a single player could participate as described herein through a plurality of different physical computing platforms. For example, user module 26 and/or user module 114 could provide for a single player to use a plurality of different computing platforms. Similarly, the issuance and attempts of challenges and re-challenges between a plurality of players may be accomplished through a single computing platform, as the players access the game through different user profiles.

It will be appreciated that the illustration of first computing platform 12 and second computing platform 14 including completely separate sets of modules is not intended to be limited. In some implementations, some of the redundancy in the functionality provided by the modules of first computing platform 12 and the modules of second computing platform 14 may be reduced by providing some of the redundant functionality via a server in communication with one or both of first computing platform 12 and/or second computing platform 14.

Figure 17:
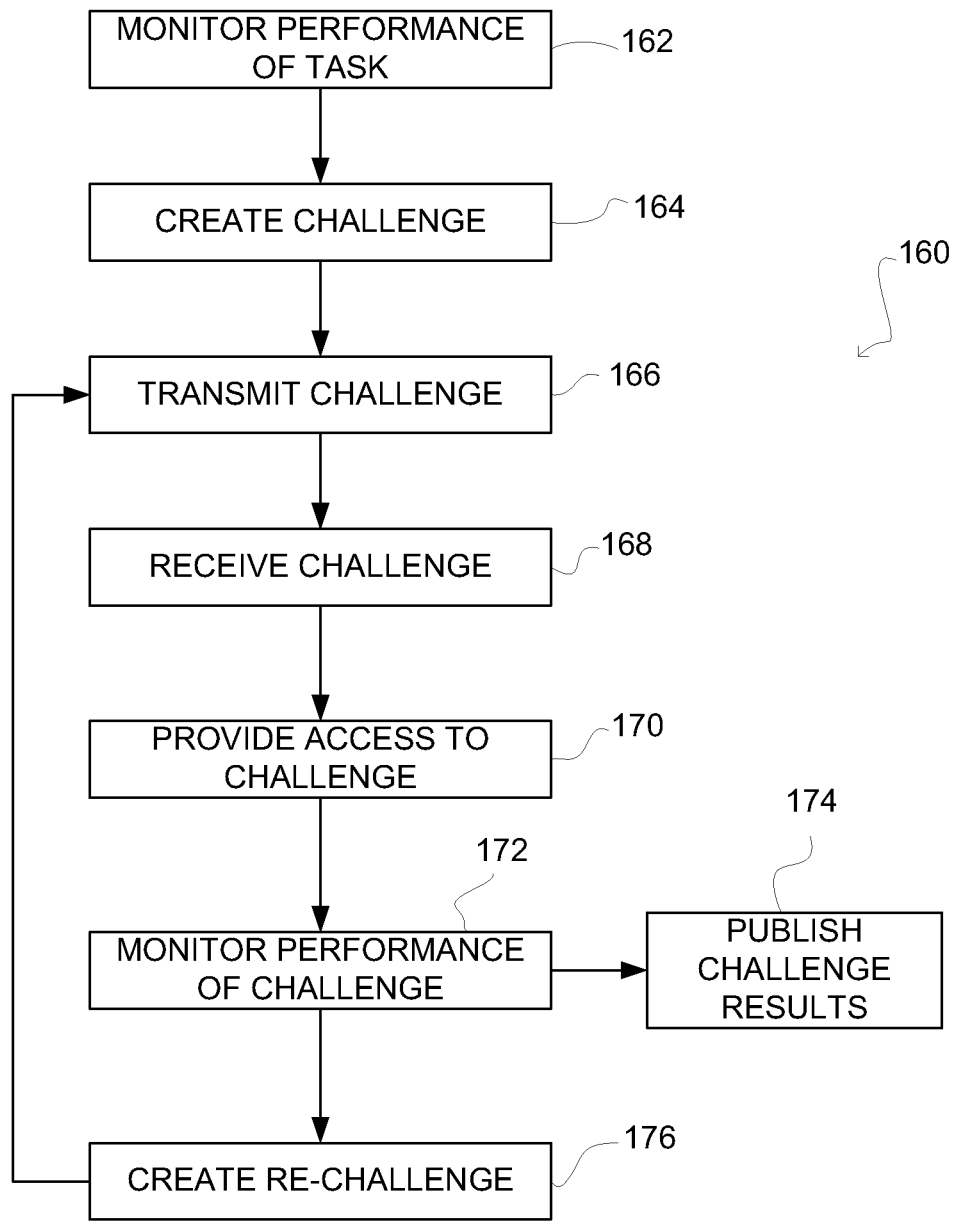
FIG. 17 illustrates a method of enabling players to participate in competitive challenges within a videogame.

FIG. 17 illustrates a method 160 of enabling players to participate in competitive challenges within a videogame. The operations of method 160 presented below are intended to be illustrative. In some embodiments, method 160 may be accomplished with one or more additional operations not described, and/or without one or more of the operations discussed. Additionally, the order in which the operations of method 160 are illustrated in FIG. 17 and described below is not intended to be limiting.

In some embodiments, method 160 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 160 in response to instructions stored electronically on an electronic storage medium. The one or more processing devices may include one or more devices configured through hardware, firmware, and/or software to be specifically designed for execution of one or more of the operations of method 160.

At an operation 162, performance of a task within the videogame by the first player may be monitored. The performance of the task may be monitored with respect to one or more performance metrics. In some implementations, operation 162 may be performed by a performance monitoring module similar to or the same as performance monitoring module 28 and/or performance monitoring module 116 (shown in FIG. 1 and described above).

At an operation 164, a challenge may be created based on performance of the task by the first player. The challenge may be created such that to complete the challenge the task must be performed while at least equaling the performance of the first player with respect to at least one of the monitored performance metrics. Creation of the challenge may include customizing the challenge and/or selecting which performance metrics should be used to determine completion of the challenge. Creation of the challenge may include determining one or more other users, such as a second player, to whom the challenge should be presented. In some implementations, performance of operation 164 may be performed by a challenge creation module, a challenge criteria module, and/or a challenge customization module similar to or the same as challenge creation module 30, challenge criteria module 32, and/or challenge customization module 34, and/or challenge creation module 118, challenge criteria module 120, and/or challenge customization module 122 (shown in FIG. 1 and described above).

At an operation 166, transmission of the created challenge may be initiated to the appropriate player(s). For example, transmission of the created challenge to the second player may be initiated. The challenge may be transmitted in the form of a challenge invitation. In some implementations, operation 166 may be performed by a challenge communication module similar to or the same as challenge access module 38 and/or challenge communication module 124 (shown in FIG. 1 and described above).

At an operation 168, the challenge (and/or corresponding challenge invitation) may be received by the second user (and/or a computing platform associated therewith). In some implementations, operation 168 may be performed by a challenge communication module similar to or the same as challenge access module 38 and/or challenge communication module 124 (shown in FIG. 1 and described above).

At an operation 170, access to the received challenge may be provided to the second player, in response to receiving acceptance from the second player of the received challenge. Providing access to the challenge for the second player may include enabling the second player to attempt the task associated with the challenge in the videogame. In some implementations, operation 170 may be performed by a challenge access module similar to or the same as challenge access module 38 and/or challenge access module 126 (shown in FIG. 1 and described above).

At an operation 172, performance of the task by the second player may be monitored. The performance of the second player may be monitored with respect to the one or more performance metrics associated with the challenge. Monitoring the performance of the second player may include determining a result of the attempt to complete the challenge. In some implementations, operation 172 may be performed by a challenge monitoring module similar to or the same as challenge monitoring module 40 and/or challenge monitoring module 128 (shown in FIG. 1 and described above).

At an operation 174, transmission of the result of the attempt of the second player to complete the challenge may be initiated. The transmission initiated may include transmission to the first player, other players that received the challenge, and/or other players or groups of players. In some implementations, operation 174 may be performed by a challenge communication module similar to or the same as challenge access module 38 and/or challenge communication module 124 (shown in FIG. 1 and described above).

At an operation 176, responsive to completion of the challenge by the second player, a re-challenge may be created. To complete the re-challenge the task must be performed while at least equaling the performance of the second player with respect to the performance metric(s) associated with the challenge. In some implementations, operation 176 may be performed by a challenge creation module, a challenge criteria module, and/or a challenge customization module similar to or the same as challenge creation module 30, challenge criteria module 32, and/or challenge customization module 34, and/or challenge creation module 118, challenge criteria module 120, and/or challenge customization module 122 (shown in FIG. 1 and described above).

Upon creation of the re-challenge at operation 176, method 160 may return to operations 166, 168, 170, 172, and 174, where the re-challenge may be processed in a manner similar to or the same as the processing of the challenge described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to enable players to participate in competitive challenges within a videogame, the system comprising:
    a server in communication with a plurality of computing platforms configured to execute a videogame, each of the plurality of computing platforms comprising one or more processors, the one or more processors being configured to execute computer program modules to provide a first player with the videogame, the computer program modules comprising:
        a first performance monitoring module on a first computing platform configured to quantify performance of a task by the first player within the videogame by determining a value for at least one performance metric characterizing the performance of the task by the first player;
        a first challenge creation module on the server or on the first computing platform configured to create, subsequent to completion of the task by the first player, a challenge for a second player, wherein to complete the challenge the second player must perform the task in accordance with at least one challenge metric and wherein the at least one challenge metric corresponds to the at least one performance metric that characterizes the performance of the task by the first player;
        a first challenge communication module on the server configured to initiate transmission of a challenge invitation associated with the challenge to a second computing platform associated with the second player; and
        a first challenge access module on the first computing platform configured to receive acceptance, by the first player, of a second challenge sent from the second player, and, responsive to the acceptance, to provide access to the second challenge to the first player so that the first player can attempt the second challenge within the videogame.

2. The system of claim 1, wherein the first challenge creation module is further configured to receive a selection of the second player by the first player, and wherein the first challenge communication module is further configured such that transmission of the challenge invitation to the second player is based on the selection of the second player by the first player.

3. The system of claim 1, further comprising a first challenge criteria module configured to receive selection by the first player of the at least one performance metric, and, responsive to the received selection, to include the at least one challenge metric in the challenge.

4. The system of claim 1, further comprising a first challenge customization module configured to customize the challenge by including content selected by the first player in the challenge invitation.

5. The system of claim 4, wherein the first player selected content comprises one or more of text, video, still images, or audio.

6. The system of claim 1, further comprising a second computing platform associated with the second player, the second computing platform associated with the second player comprising one or more processors executing computer program modules to provide the videogame to the second player, the computer program modules comprising: a second challenge communication module on the server configured to receive the challenge invitation, and to convey the challenge invitation to the second player; a second challenge access module on the second computing platform configured to receive acceptance of the challenge by the second player, and to provide, responsive to the acceptance, access to the challenge to the second player so that the second player can attempt the task within the videogame.

7. The system of claim 6, wherein the second challenge access module is configured to provide temporary access to locked videogame content responsive to the task including videogame content not previously unlocked by the second player.

8. The system of claim 7, wherein the locked videogame content comprises one or more of a venue, a vehicle, an aircraft, a pet, a weapon, a virtual opponent, or a virtual teammate.

9. The system of claim 6, wherein the computer program modules executed by the one or more processors of the computing platform and the server associated with the second player further comprise: a second performance monitoring module on the second computing platform configured to quantify performance of the task by the second player within the videogame by determining a value for the at least one performance metric that corresponds to the at least one challenge metric; and a second challenge monitoring module on the server or the second computing platform configured to determine whether the second player has completed the challenge based on a comparison of the values for the at least one performance metric achieved by the second player with the values for the at least one challenge metric that is dictated by the challenge.

10. The system of claim 9, wherein the second challenge communication module is further configured to initiate transmission of a result of the performance of the task by the second player to the first computing platform associated with the first player, wherein the result of the performance of the task by the second player indicates whether the second player completed the challenge during performance of the task.

11. The system of claim 6, wherein the computer program modules executed by the one or more processors of the computing platform associated with the second player further comprise:
a second challenge creation module on the server or the second computing platform, configured to create, responsive to the second player completing the challenge, a re-challenge for the first player, wherein to complete the re-challenge the first player must perform the task in accordance with a values dictated by the re-challenge-wherein the values dictated by the re-challenge includes a value for a first re-challenge metric that is based on a value for a corresponding performance metric determined by the second performance monitoring module in quantifying performance of the task by the second player as the second player completed the challenge, and wherein the second challenge communication module is further configured to initiate transmission of a challenge invitation associated with the re-challenge to the first computing platform associated with the first player.

12. The system of claim 11, wherein the first re-challenge metric includes a parameter that was not included in the at least one challenge metric.

13. The system of claim 12, wherein the computer program modules executed by the one or more processors of the server and the second computing platform associated with the second player further comprise: a second challenge criteria module configured to receive a selection by the second player of a performance metric, and, responsive to the received selection, to include the performance metric in the re-challenge metric.

14. A method for enabling a first player to participate in a competitive challenge with a second player within a videogame, the method comprising:
using a first performance monitoring module, quantifying a performance of a task by the first player within the videogame by determining a value for at least one performance metric characterizing the performance of the task by the first player;
using a first challenge creation module, creating, subsequent to completion of the task by the first player, a challenge for a second player, wherein to complete the challenge the second player must perform the task in accordance with at least one challenge metric and wherein the at least one challenge metric corresponds to the at least one performance metric that characterizes the performance of the task by the first player;
using a first challenge communication module, initiating transmission of a challenge invitation associated with the challenge to a computing platform associated with the second player; and
using a first challenge access module, receiving acceptance of a second challenge sent from the second player, and, responsive to the acceptance, providing access to the second challenge to the first player so that the first player can attempt the second challenge within the videogame.

15. The method of claim 14, further comprising, using the first challenge creation module, receiving from the first player a selection of the second player and basing the transmission of the challenge invitation to the second player on said selection.

16. The method of claim 14, further comprising, using a first challenge criteria module, receiving a selection by the first player of the at least one performance metric and, responsive to the received selection, including the at least one challenge metric in the challenge.

17. The method of claim 14, further comprising, using a first challenge customization module, customizing the challenge by including content selected by the first player in the challenge invitation.

18. The method of claim 17, wherein the first player selected content comprises one or more of text, video, still images, or audio.

19. The method of claim 14, further comprising:
using a second challenge communication module, receiving the challenge invitation and conveying the challenge invitation to the second player; and
using a second challenge access module, receiving an acceptance of the challenge by the second player and providing, responsive to the acceptance, access to the challenge to the second player so that the second player can attempt the task within the videogame.

20. The method of claim 19, further comprising, using the second challenge access module, providing temporary access to locked videogame content responsive to the task including videogame content not previously unlocked by the second player.

21. The method of claim 20, wherein the locked videogame content comprises one or more of a venue, a vehicle, an aircraft, a pet, a weapon, a virtual opponent, or a virtual teammate.

22. The method of claim 19, further comprising:
using a second performance monitoring module, quantifying a performance of the task by the second player within the videogame by determining a value for the at least one performance metric that corresponds to the at least one challenge metric; and
using a second challenge monitoring module, determining whether the second player has completed the challenge based on a comparison of the value for the at least one performance metric achieved by the second player with the value for the at least one challenge metric that is dictated by the challenge.

23. The method of claim 19, further comprising, using the second challenge communication module, initiating transmission of a result of the performance of the task by the second player to a computing platform associated with the first player, wherein the result of the performance of the task by the second player indicates whether the second player completed the challenge during performance of the task.

24. The method of claim 19, further comprising:
using a second challenge creation module, creating, responsive to the second player completing the challenge, a re-challenge for the first player, wherein to complete the re-challenge the first player must perform a second task in accordance with at least one value dictated by the re-challenge and wherein the at least one value dictated by the re-challenge includes a value for a first re-challenge metric that is based on a value for a corresponding performance metric determined by a second performance monitoring module in quantifying a performance of the second task by the second player as the second player completed the challenge; and using the second challenge communication module, initiating a transmission of a challenge invitation associated with the re-challenge to a computing platform associated with the first player.

25. The method of claim 24, wherein the first re-challenge metric includes a parameter that was not included in the at least one challenge metric.

26. The method of claim 25, further comprising, using a second challenge criteria module, receiving a selection by the second player of a performance metric, and, responsive to the received selection, including the performance metric in the first re-challenge metric.

\* \* \* \* \*